United States Patent
Lee et al.

(10) Patent No.: US 12,531,084 B1
(45) Date of Patent: Jan. 20, 2026

(54) TARGET LIKELIHOOD FUSION

(71) Applicant: Amazon Technologies, Inc., Seattle, WA (US)

(72) Inventors: Borham Lee, Woodside, CA (US); Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 18/614,923

(22) Filed: Mar. 25, 2024

(51) Int. Cl.
| | |
|---|---|
| G10L 25/51 | (2013.01) |
| G10L 15/00 | (2013.01) |
| G10L 15/06 | (2013.01) |
| G10L 15/22 | (2006.01) |
| G10L 25/78 | (2013.01) |
| G10L 25/87 | (2013.01) |

(52) U.S. Cl.
CPC .............. *G10L 25/87* (2013.01); *G10L 15/00* (2013.01)

(58) Field of Classification Search
CPC ....... G10L 25/51; G10L 15/063; G10L 15/22; G10L 25/78; G10L 2015/0635
See application file for complete search history.

(56) References Cited

U.S. PATENT DOCUMENTS

| | | | | |
|---|---|---|---|---|
| 2005/0131684 A1* | 6/2005 | Clelland | ................. | G10L 15/22 |
| | | | | 704/E15.04 |
| 2015/0302855 A1* | 10/2015 | Kim | ........................ | G10L 15/22 |
| | | | | 704/275 |
| 2015/0302856 A1* | 10/2015 | Kim | ........................ | G10L 15/22 |
| | | | | 704/273 |
| 2018/0130469 A1* | 5/2018 | Gruenstein | ............. | G10L 25/51 |
| 2020/0118544 A1* | 4/2020 | Lee | ........................ | G10L 15/063 |
| 2020/0150919 A1* | 5/2020 | Rand | ...................... | H04R 1/406 |
| 2021/0390948 A1* | 12/2021 | Shah | ........................ | G10L 15/22 |
| 2021/0409878 A1* | 12/2021 | Pedersen | .............. | H04R 25/405 |
| 2022/0284883 A1* | 9/2022 | Buchter | .................. | G10L 15/20 |

* cited by examiner

*Primary Examiner* — Mohammad K Islam
(74) *Attorney, Agent, or Firm* — Pierce Atwood LLP

(57) ABSTRACT

A system configured to improve SSL processing and/or target goal detection by fusing SSL data with object information to generate a combined target likelihood estimate that takes into account what the device knows about the surrounding environment. For example, the device may generate object information by performing object detection, floorplan estimation, distance measurements, and/or the like. Using this object information, the device may calculate a likelihood estimate value for each direction around the device, with known objects (e.g., walls) corresponding to low likelihood values. In response to an acoustic event (e.g., wakeword detection), the device may fuse the target likelihood estimates generated using SSL data and/or object information to generate the combined target likelihood estimate. Thus, the combined target likelihood estimate enables the device to accurately associate the acoustic event with a corresponding SSL track (e.g., direct sound) and ignore reflections caused by objects in the environment.

20 Claims, 18 Drawing Sheets

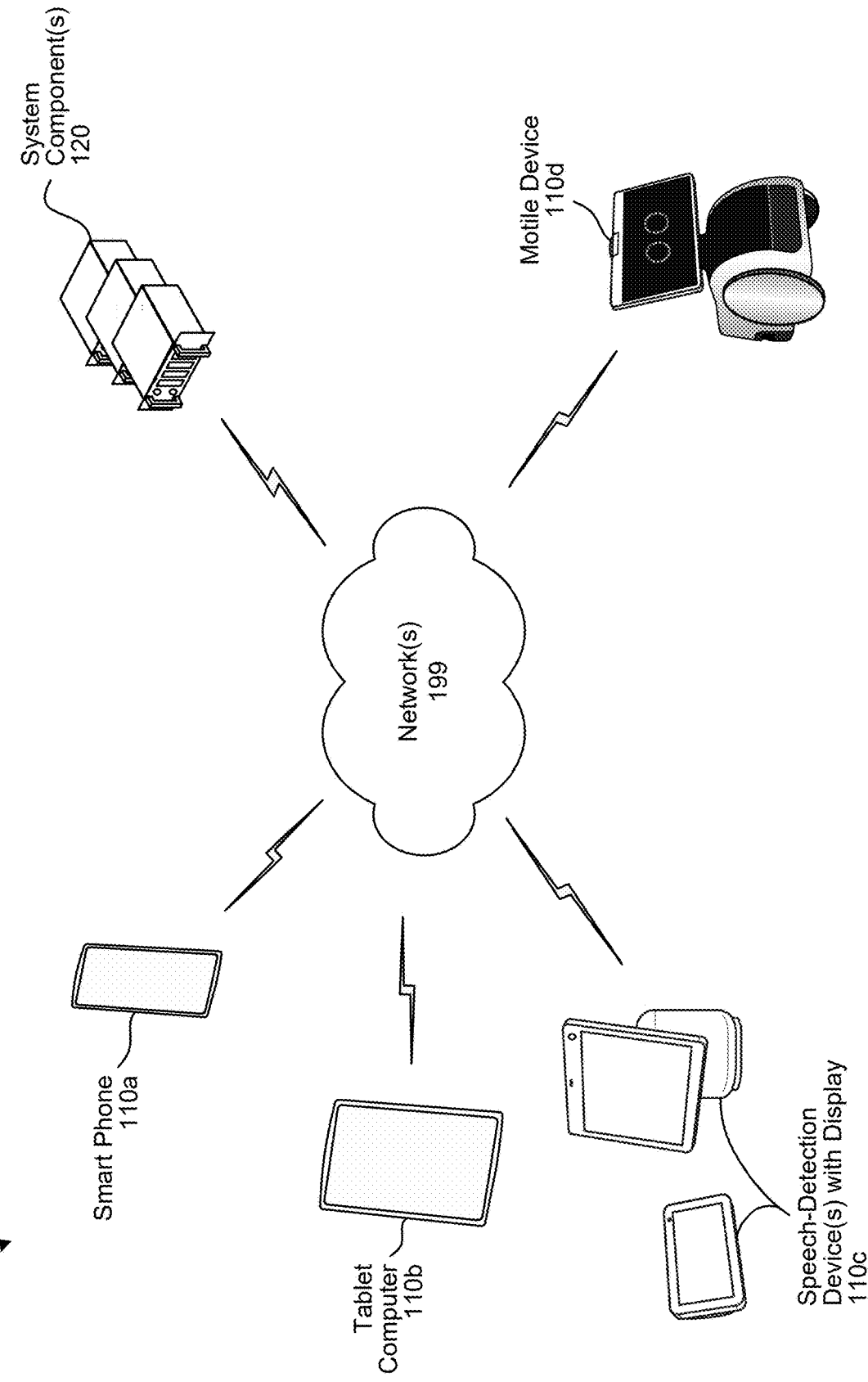

TARGET LIKELIHOOD FUSION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 15 illustrates an example of a computer network for use with a speech processing system.

DETAILED DESCRIPTION

Figure 1:
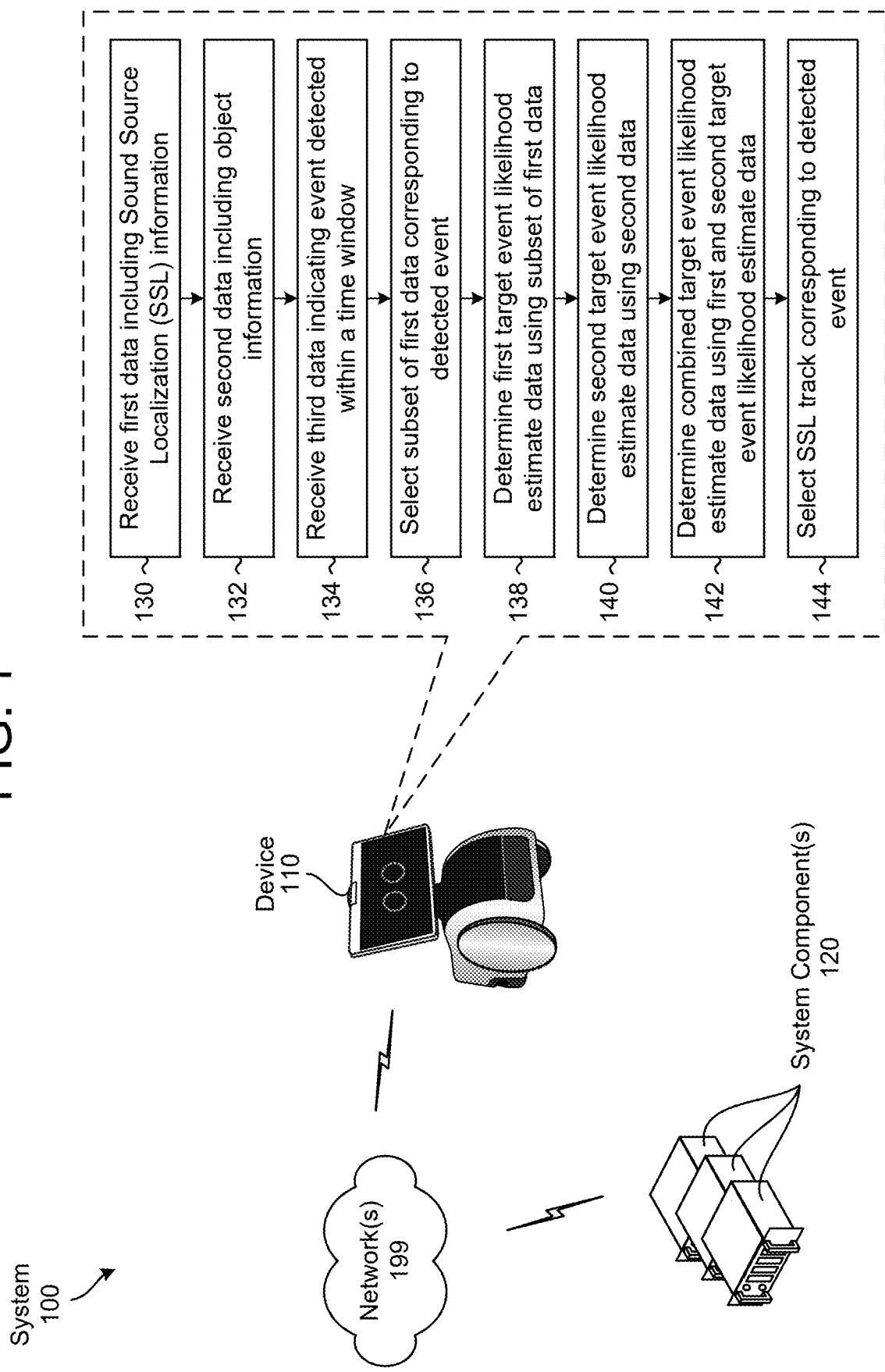
FIG. 1 illustrates a system configured to perform target likelihood fusion according to embodiments of the present disclosure.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization (SSL) processing to distinguish between multiple sound sources represented in the audio data.

While SSL processing separates the audio data based on the sound source, the device cannot tell which sound source is associated with the desired speech. In addition, the device may struggle to distinguish between an actual direction associated with the desired speech (e.g., direct sound) and acoustic reflections of the desired speech. If the device is capable of autonomous movement (e.g., robot device configured to detect and navigate obstacles in an environment), SSL processing is further degraded when there are strong signal reflections caused by walls and other acoustically reflective surfaces. For example, movement of the device results in an environment around the device constantly changing, reducing an accuracy of SSL processing and increasing the difficulty of distinguishing between direct sound and acoustic reflections.

To improve SSL processing and/or perform target goal detection, devices, systems and methods are disclosed that fuse SSL data with object information to generate a combined target likelihood estimate that takes into account what the device knows about the surrounding environment. For example, the device may perform SSL processing on input audio data to generate SSL data indicating one or more sound sources represented in the input audio data (e.g., one or more SSL tracks). In some examples, the SSL data may include target likelihood estimates for each direction around the device (e.g., 360 degrees) and/or individual sound source. In addition, the device may generate object information and may use the object information to determine target likelihood estimates associated with one or more objects. For example, the device may use one or more sensors to generate object information by performing object detection, floorplan estimation, distance measurements, and/or the like and may calculate likelihood estimate values for each direction around the device, with known objects (e.g., walls) corresponding to low likelihood values.

In response to detecting an acoustic event, the device may perform target goal detection to select the sound source that corresponds to the acoustic event (e.g., SSL track selection). For example, the device may detect an acoustic event by performing wakeword detection and may fuse the target likelihood estimates generated using SSL data and/or object information to generate the combined target likelihood estimate, which also associates known objects with low likelihood values. Thus, the combined target likelihood estimate enables the device to accurately associate the acoustic event with a corresponding SSL track (e.g., direct sound) and ignore reflections caused by objects in the environment.

FIG. 1 illustrates a system configured to perform target likelihood fusion according to embodiments of the present disclosure. Although FIG. 1 and other figures/discussion illustrate the operation of the system in a particular order, the steps described may be performed in a different order (as well as certain steps removed or added) without departing from the intent of the disclosure. As illustrated in FIG. 1, the system 100 may include a device 110 and/or system component(s) 120 that may be communicatively coupled to network(s) 199.

In some examples, the device 110 may be an electronic device configured to capture audio data and/or image data. For example, the device 110 may include a camera or image sensor configured to generate image data that captures input video, although the disclosure is not limited thereto. In addition, the device 110 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

Whether the microphones are included as part of a microphone array, as discrete microphones, and/or a combination thereof, the device 110 may generate the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K). For example, if the microphone array includes eight individual microphones, the audio data may include eight individual channels.

To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. In some examples, the device may perform sound source localization (SSL) processing to distinguish between multiple sound sources represented in the audio data, as will be described in greater detail below. For example, the device 110 may perform SSL processing to generate SSL data, which may indicate when an individual sound source is represented in the audio data, a direction/location associated with the sound source, target likelihood estimates for each direction around the device (e.g., 360 degrees) and/or individual sound source, and/or the like, although the disclosure is not limited thereto.

In some examples, the system 100 may be configured to capture audio representing a voice command and perform an action responsive to the voice command. For example, in response to detecting a wakeword and/or system-directed input command, the device 110 may identify a sound source (e.g., perform SSL track selection) corresponding to desired speech and generate audio data representing the desired speech. Using the audio data, the system 100 may perform language processing to determine an action to perform that is responsive to the desired speech (e.g., voice command). For example, the voice command(s) may control the device 110, audio devices (e.g., play music over loudspeaker(s), capture audio using microphone(s), or the like), multimedia devices (e.g., play videos using a display, such as a television, computer, tablet or the like), smart home devices (e.g., change temperature controls, turn on/off lights, lock/unlock doors, etc.), and/or the like without departing from the disclosure.

In some examples, the device 110 may be configured to perform the language processing without departing from the disclosure. For example, the device 110 may send the output audio data to a language processing component associated with the device 110 and the language processing component may perform language processing using the output audio data to determine an action responsive to the voice command. To cause the action to be performed, the device 110 may perform the action itself, may send a command to other device(s) associated with the user profile, may send the command to the system component(s) 120, and/or the like without departing from the disclosure. The disclosure is not limited thereto, however, and in other examples the system component(s) 120 may be configured to perform the language processing and the device 110 may send output audio data associated with the selected sound source (e.g., selected SSL track) to the system component(s) 120 via the network(s) 199. For example, the system component(s) 120 may perform language processing using the output audio data to determine an action to be performed that is responsive to the voice command. The system component(s) 120 may cause the action to be performed by sending a command to the device 110 and/or other device(s) associated with a user profile.

In some examples, the device 110 may be motile (e.g., capable of motion) and may be referred to as a motile device, autonomously motile device, etc., although the disclosure is not limited thereto. Thus, the device 110 may be capable of moving within the environment independently of a user without departing from the disclosure, enabling the device 110 to perform additional actions by moving towards the user, relative to the user, traveling within the environment, and/or the like without departing from the disclosure. For example, the device 110 may be at a first location within the environment and may move to a second location within the environment 102 to perform an action. The disclosure is not limited thereto, however, and in some examples the device 110 may be stationary but capable of moving components relative to the device 110. For example, the device 110 may be a stationary device 110 capable of rotating and/or tilting a display without departing from the disclosure.

The device 110 may be capable of autonomous motion using one or motors powering one or more wheels, treads, robotic limbs, or similar actuators, but the present disclosure is not limited to particular method of autonomous movement/motion. The device 110 may, for example, follow a user around a room, may explore the room, and/or perform additional actions without departing from the disclosure.

The device 110 may further include one or more sensors; these sensors may include, but are not limited to, a light based time-of-flight sensor, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. The disclosure is not, however, limited to only these devices or components, and the device 110 may include additional components without departing from the disclosure.

A light based time-of-flight sensor, such as a Light Detection and Ranging (lidar) sensor, may be configured to provide distance information by utilizing laser light. For example, the laser is scanned across an environment at various points, emitting pulses which may be reflected by objects within the environment. Based on the time-of-flight distance to that particular point, sensor data may be generated that is indicative of the presence of objects and the relative positions, shapes, and so forth that are visible to the sensor. Data from the sensor may be used to generate an occupancy map or other environment map representing the environment and/or for navigation by the motile device within the environment.

To navigate throughout the environment, in some examples the device 110 may generate an occupancy map representing potential obstacles in the environment. For example, the occupancy map may represent a map of the environment using a grid having a plurality of grid units (which may also be referred to as cells). The grid may be two- or three-dimensional; each grid unit or cell may be, for example, one meter on each side, although the disclosure is not limited thereto. The occupancy map may represent stationary objects and/or obstacles (e.g., walls, furniture, and/or other objects) that may impede navigation of the device 110 within the environment. For example, first cells in the occupancy map may have a first value indicating that the cell is occupied (e.g., an obstacle is present), while second cells in the occupancy map may have a second value indicating that the cell is not occupied (e.g., no obstacles are present).

To generate the occupancy map, the device 110 may optionally travel within the environment and capture the environment using one or more sensors (e.g., lidar sensor, camera, depth sensor, and/or the like). In some examples, the device 110 may generate input scan data of the environment as part of an explicit enrollment or initialization period (e.g., home tour). For example, if the device 110 is motile, the device 110 may conduct a tour to explore the environment in order to generate raw input scans that may be used to generate the occupancy map, an environment map, and/or the like representing the environment. However, the disclosure is not limited thereto, and in other examples the device 110 may generate the input scan data while navigating the environment while performing an action without departing from the disclosure.

While the example described above refers to the device 110 using a lidar sensor to generate distance information, the disclosure is not limited thereto and the device 110 may capture the environment using any of the one or more sensors (e.g., lidar sensor, camera, depth sensor, and/or the like) without departing from the disclosure. For example, the device 110 may capture the environment using a camera, such as by generating image data and performing computer vision (CV) processing using the image data.

While the example described above refers to the device 110 generating an occupancy map, an environment map, and/or the like, the disclosure is not limited thereto. For ease of illustration, the following description may refer to floorplan data to describe any representation of the environment that indicates a location of stationary objects and/or obstacles (e.g., walls, furniture, and/or other objects) that may impede navigation of the device 110 within the environment. Thus, floorplan data may include and/or refer to an occupancy map, an environment map, an obstacle map, a floorplan, other representation(s) of the environment, a combination thereof, and/or the like without departing from the disclosure. While the example described above refers to the device 110 generating the floorplan data (e.g., occupancy map), the disclosure is not limited thereto. Instead, other components and/or devices included in the system 100 may generate the floorplan data and the device 110 may receive the floorplan data without departing from the disclosure.

Similarly, the following description may refer to object data to describe any representation of objects and/or object information associated with objects present in the environment. As used herein, an object may be any tangible person or thing detected in the environment, which may include walls, obstacles, humans, pets, furniture, appliances, and/or the like. Thus, object data may include and/or refer to object information, object detection data, distance measurements and/or sensor data associated with an object, and/or the like, although the disclosure is not limited thereto. For example, the object data may indicate a type of object, direction(s) of the object relative to the device 110, location(s) of the object within the environment (e.g., current and/or historical), a distance value associated with the object (e.g., distance between the device 110 and the object), and/or additional information without departing from the disclosure. Additionally or alternatively, the object data may correspond to individual objects (e.g., walls, obstacles, humans, pets, appliances, furniture, household items, etc.), groups of objects (e.g., two or more objects having an explicit association), types of objects (e.g., all walls or obstacles, all humans detected in the environment, etc.), and/or a combination thereof without departing from the disclosure.

Thus, in some examples there may be overlap and/or redundancy between floorplan data and object data. For example, object data may refer to any object detected in the environment, while floorplan data may refer to a subset of the object data that is stationary and/or impedes navigation of the device 110. The disclosure is not limited thereto, however, and in other examples the floorplan data may be unrelated to the object data without departing from the disclosure.

As illustrated in FIG. 1, the device 110 may be a motile device capable of autonomous movement, such as a robot device configured to detect and navigate obstacles in an environment. For example, the device 110 may be configured to navigate obstacles and travel through different rooms of a residence or business, enabling the device 110 to perform security monitoring and/or other tasks, although the disclosure is not limited thereto. While some tasks may involve interacting with a user, the device 110 is capable of performing tasks independently, which may involve navigating and traveling autonomously. The disclosure is not limited thereto, however, and the device 110 may be a stationary device capable of movement, such as by rotating or tilting a display, without departing from the disclosure.

While SSL processing separates the audio data based on the sound source, the device 110 may be unable to determine which sound source is associated with the desired speech. In addition, the device 110 may struggle to distinguish between an actual direction associated with the desired speech (e.g., direct sound) and acoustic reflections of the desired speech. As the device 110 is capable of autonomous movement, SSL processing is further degraded when there are strong signal reflections caused by walls and other acoustically reflective surfaces. For example, movement of the device 110 results in an environment around the device 110 constantly changing, reducing an accuracy of SSL processing and increasing the difficulty of distinguishing between direct sound and acoustic reflections.

To improve SSL processing and/or perform target goal detection, the system 100 may fuse SSL data with object information to generate a combined target likelihood estimate that takes into account what the device knows about the surrounding environment. For example, the device 110 may perform SSL processing on input audio data to generate SSL data indicating one or more sound sources represented in the input audio data (e.g., one or more SSL tracks). In some examples, the SSL data may include target likelihood estimates for each direction around the device 110 (e.g., 360 degrees) and/or individual sound source. In addition, the device 110 may generate object information and may use the object information to determine target likelihood estimates associated with one or more objects. For example, the device 110 may use one or more sensors to generate object information by performing object detection, floorplan estimation, distance measurements, and/or the like and may calculate likelihood estimate values for each direction around the device 110, with known objects (e.g., walls) corresponding to low likelihood values.

In response to detecting an acoustic event, the device 110 may perform target goal detection to select the sound source that corresponds to the acoustic event (e.g., SSL track selection). For example, the device 110 may detect an acoustic event by performing wakeword detection and may fuse the target likelihood estimates generated using SSL data and/or object information to generate the combined target likelihood estimate, which also associates known objects with low likelihood values. Thus, the combined target likelihood estimate enables the device 110 to accurately associate the acoustic event with a corresponding SSL track (e.g., direct sound or direct SSL track) and ignore reflections caused by objects in the environment (e.g., reflected SSL tracks).

Additionally or alternatively, the combined target likelihood estimate enables the device 110 to improve an accuracy and/or resolution of a direction associated with the SSL track, even without interference caused by acoustic reflections. For example, SSL processing may be limited to a first resolution or margin of error (e.g., +/−10°), such that the device 110 may identify a sound source and associate the sound source with a first range of directions (e.g., sound source is located between 50°-70°). In contrast, object detection may be associated with a second resolution or margin of error (e.g., +/−2°), such that the combined target likelihood estimate may enable the device 110 to associate the sound source with a second range of directions (e.g., sound source is located between 58°-62°). Alternatively, the combined target likelihood estimate may indicate that a majority of the first range of directions is associated with a hard surface (e.g., wall or other obstacle), enabling the device 110 to select from objects detected within the first range of directions. For example, the device 110 may associate the sound source with a third range of directions (e.g., sound source is located between 50°-54°), although the disclosure is not limited thereto.

Ideally, the device 110 would select from the direct SSL tracks and not select one of the reflected SSL tracks. To avoid selecting one of the reflected SSL tracks, some conventional systems may remove the reflected SSL tracks entirely. However, if the device 110 misidentifies a direct SSL track as a reflected SSL track, removing all of the reflected SSL tracks may result in the device 110 selecting the wrong SSL track for the acoustic event.

Instead of removing the reflected SSL tracks completely, in some examples the device 110 may reduce a confidence score associated with a reflected SSL track. For example, the device 110 may set the confidence score to a first value (e.g., 0.5), an average of a track power value and a correlation value, and/or the like without departing from the disclosure. Thus, the device 110 may reduce the likelihood that the reflected SSL track is selected during SSL track selection, without discarding each of the reflected SSL tracks entirely.

As illustrated in FIG. 1, the device 110 may receive (130) first data including sound source localization (SSL) information. For example, the device 110 may perform SSL processing to determine the first data, which may include a plurality of likelihood values. Thus, an individual likelihood value may correspond to a particular direction (e.g., azimuth) relative to the device 110 and may indicate a likelihood that a sound source corresponds to this direction (e.g., how likely this direction will have a sound source). Details associated with performing SSL processing will be described in greater detail below with regard to FIGS. 2 and 4. The device 110 may also receive (132) second data including object information. For example, the device 110 may perform object detection processing to determine the second data, which may include information associated with an individual object, such as a location of the object, a type of object, and/or the like. Details associated with performing object detection processing, floorplan estimation, and/or the like will be described in greater detail below with regard to FIGS. 2 and 3.

As illustrated in FIG. 1, the device 110 may receive (134) third data indicating an event detected within a time window and may select (136) a subset of the first data corresponding to the detected event. For example, the third data may correspond to event data that indicates a start time of the event, an end time of the event, a type of event, and/or the like, as will be described in greater detail below with regard to FIG. 2. Using the start time and/or the end time, the device 110 may determine the time window associated with the event and select the subset of the first data that overlaps this time window. Additionally or alternatively, the device 110 may select the subset of the first data based on the type of event without departing from the disclosure.

While not illustrated in FIG. 1, the device 110 may perform time synchronization to synchronize the first data, the second data, and/or the third data without departing from the disclosure. For example, the device 110 may generate synchronized timestamps as part of generating and/or processing the first data, the second data, and the third data, using a global clock or other synchronization process. Thus, the synchronized timestamps may enable the device 110 to associate SSL information, object information, event data, sensor data, and/or the like for a specific time window with great accuracy, despite individual components of the device 110 using different clocks and/or timing information.

The device 110 may determine (138) first target event likelihood estimate data using the subset of the first data, may determine (140) second target event likelihood estimate data using the second data, and may determine (142) combined target event likelihood estimate data using the first target event likelihood estimate data and the second target event likelihood estimate data. For example, the device 110 may generate combined likelihood estimates using first likelihood estimates associated with the first data (e.g., SSL information) and second likelihood estimates associated with the second data (e.g., object detection information). Details associated with performing fusion processing to generate the combined likelihood estimates (e.g., fused likelihood data) will be described in greater detail below with regard to FIGS. 2 and 5.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing without departing from the disclosure. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

In some examples, the device 110 may generate microphone audio data z(t) in the time-domain, which is comprised of a sequence of individual samples of audio data. Thus, z(t) denotes an individual sample that is associated with a time t. While the microphone audio data z(t) is comprised of a plurality of samples, in some examples the device 110 may group a plurality of samples and process them together. For example, the device 110 may group a number of samples together in a frame to generate microphone audio data z(n). As used herein, a variable z(n) corresponds to the time-domain signal and identifies an individual frame (e.g., fixed number of samples s) associated with a frame index n.

In some examples, the device 110 may convert microphone audio data z(t) from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) as a first time-domain signal associated with a first subband (e.g., first frequency range), a second bandpass filter may output a second portion of the microphone audio data z(t) as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) in the time-domain to microphone audio data z(t, k) in the subband-domain. However, the disclosure is not limited thereto, and the device 110 may convert microphone audio data z(n) in the time-domain to microphone audio data z(n, k) the subband-domain without departing from the disclosure.

Additionally or alternatively, the device 110 may convert microphone audio data z(n) from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) in the frequency-domain. As used herein, a variable Z(n, k) corresponds to the frequency-domain signal and identifies an individual frame associated with frame index n and tone index k.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data z(n), producing the frequency-domain microphone audio data Z(n, k), where the tone index "k" (e.g., frequency index) ranges from 0 to K and "n" is a frame index ranging from 0 to N. Thus, the history of the values across iterations is provided by the frame index "n", which ranges from 1 to N and represents a series of samples over time.

As part of generating audio data corresponding to an individual sound source and/or SSL track, the device 110 may be configured to perform beamforming. For example, the device 110 may process the audio data using a beamformer component to generate directional audio data in order to isolate a speech signal represented in the audio data. However, in order to isolate the desired speech signal, in some examples the device 110 may identify a look direction associated with the desired speech signal. The disclosure is not limited thereto, however, and in other examples the device 110 may perform beamforming to generate a plurality of directional audio data without departing from the disclosure. For example, the device 110 may determine a first number of directional audio signals using a fixed configuration, although the disclosure is not limited thereto.

In general, an amount and/or type(s) of object information available to the device 110 is design-specific and varies between unique device configurations (e.g., device model, type of device, etc.) based on a number of sensor(s) and/or processing capability. For example, the number of sensors, type of sensors, accuracy (e.g., reliability, resolution, etc.) associated with sensor data, an amount of processing capacity, and/or the like may vary without departing from the disclosure. Additionally or alternatively, an accuracy and/or resolution associated with the SSL data may vary depending on a number and/or location of microphones in a microphone array, an amount of processing capacity, and/or the like without departing from the disclosure. For example, in some examples the device 110 may include a microphone array that includes eight microphones, but the disclosure is not limited thereto and in other examples a number of microphones may vary without departing from the disclosure.

For ease of illustration, the direction of the sound source may be indicated using spherical coordinates $(r, \theta, \phi)$, which may include a radius r, an azimuth $\theta$, and/or an elevation $\phi$ (e.g., polar angle). For example, the radius r indicates a radial distance of the point from a fixed origin, the azimuth $\theta$ indicates an azimuth angle of its orthogonal projection on a reference plane that passes through the origin and is orthogonal to a fixed zenith direction, and the elevation $\phi$ indicates a polar angle measured from the fixed zenith direction. Thus, the azimuth $\theta$ varies between 0 and 360 degrees, while the elevation $\phi$ varies between 0 and 180 degrees.

In some examples, the device 110 may perform target goal detection to determine a two-dimensional (2D) direction associated with the desired speech. For example, the device 110 may perform SSL track selection to select an SSL track corresponding to the desired speech and may determine an azimuth value $\theta$ representing an angle of the sound source relative to the reference plane (e.g., $0°<\theta<360°$). The disclosure is not limited thereto, however, and in other examples the device 110 may determine a three-dimensional (3D) direction associated with the desired speech without departing from the disclosure. For example, the device 110 may select an SSL track corresponding to the desired speech and determine an azimuth value $\theta$ (e.g., $0°<\theta<360°$ or $-180°<\theta<180°$) along with an elevation value $\phi$ (e.g., $0°<\phi<180°$ or $-90°<\phi<90°$), although the disclosure is not limited thereto.

Additionally or alternatively, in addition to determining a direction associated with the sound source, in some examples the device 110 may determine a distance associated with the sound source. For example, the device 110 may determine a distance value (e.g., radius r) along with the 2D direction (e.g., azimuth $\theta$) or the 3D direction (e.g., azimuth $\theta$ and elevation $\phi$) without departing from the disclosure. However, the disclosure is not limited thereto, and in other examples the device 110 may only determine a direction associated with the sound source. Thus, the radius r may vary without departing from the disclosure.

In some examples, the system 100 may be configured to capture audio representing a voice command and perform an action responsive to the voice command. For example, in response to detecting a wakeword and/or system-directed input command, the device 110 may identify a sound source (e.g., perform SSL track selection) corresponding to desired speech and generate audio data representing the desired speech. Using the audio data, the system 100 may perform language processing to determine an action to perform that is responsive to the desired speech (e.g., voice command). For example, the voice command(s) may control the device 110, audio devices (e.g., play music over loudspeaker(s), capture audio using microphone(s), or the like), multimedia devices (e.g., play videos using a display, such as a television, computer, tablet or the like), smart home devices (e.g., change temperature controls, turn on/off lights, lock/unlock doors, etc.), and/or the like without departing from the disclosure.

In some examples, the device 110 may be configured to perform language processing to determine the voice command and may perform an action corresponding to the voice command. For example, the device 110 may determine the voice command represented in the audio data and may perform an action corresponding to the voice command (e.g., execute a command, send an instruction to the system component(s) 120 and/or other devices to execute the command, etc.). However, the disclosure is not limited thereto and in other examples the device 110 may be configured to send the audio data to a natural language processing system to determine the voice command without departing from the disclosure. For example, the device 110 may send the audio data to the system component(s) 120 in order for the system component (s) 120 to determine the voice command. Therefore, the system component(s) 120 may determine the voice command represented in the audio data and may perform an action corresponding to the voice command (e.g., execute a command, send an instruction to the device 110 and/or other devices to execute the command, etc.). As part of performing language processing, the system 100 may perform Automatic Speech Recognition (ASR) processing, Natural Language Understanding (NLU) processing, command processing, and/or the like, although the disclosure is not limited thereto.

In other examples, a user of the device 110 may establish a communication session with another device, where digitized speech signals are compressed, packetized, and transmitted via the network(s) 199. One technique for establishing the communication session involves Voice over Internet Protocol (VoIP), although the disclosure is not limited thereto and the device 110 may use other techniques without departing from the disclosure. During a communication session, the device 110 may receive far-end reference signal(s) (e.g., playback audio data) from a remote device/remote server(s) via the network(s) 199 and may generate output audio (e.g., playback audio) based on the far-end reference signal(s) using the one or more loudspeaker(s).

Using one or more microphone(s) associated with the device 110, the device 110 may capture input audio as microphone signals (e.g., near-end reference audio data, input audio data, microphone audio data, etc.), may perform audio processing to the microphone signals to generate an output signal (e.g., output audio data), and may send the output signal to the remote device/remote server(s) via the network(s) 199. For example, the device 110 may send the output signal to the remote device either directly or via remote server(s) and may receive the far-end reference signal(s) from the remote device either directly or via the remote server(s).

Figure 2:
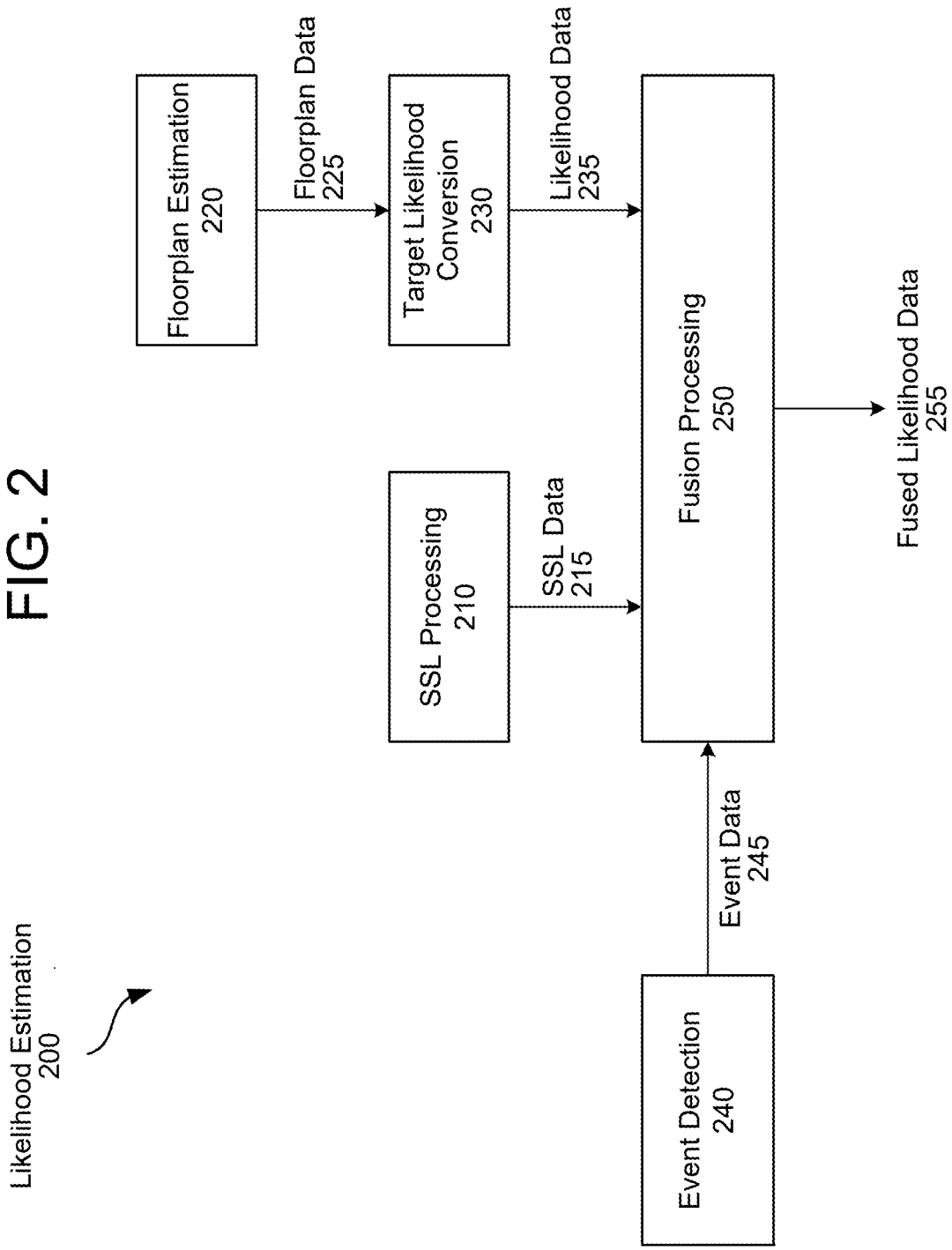
FIG. 2 is a block diagram illustrating an example of performing target goal detection using floorplan data according to embodiments of the present disclosure.

FIG. 2 is a block diagram illustrating an example of performing target goal detection using floorplan data according to embodiments of the present disclosure. As described above with regard to FIG. 1, the device 110 may improve SSL processing and/or target goal detection by fusing SSL data with object information to generate a combined target likelihood estimate that takes into account what the device knows about the surrounding environment. To conceptually illustrate a simple example, FIG. 2 illustrates an example in which the device 110 may combine the SSL data with floorplan data indicating location(s) associated with walls and/or other obstacles in proximity to the device 110. As illustrated in FIG. 2, the device 110 may perform likelihood estimation 200 using SSL data 215 and floorplan data 225. For example, the device 110 may perform SSL processing 210 to generate SSL data 215, as described in greater detail above with regard to FIG. 1.

In addition, FIG. 2 illustrates that the system 100 may perform floorplan estimation 220 to generate floorplan data 225. In some examples, the device 110 may perform the floorplan estimation to generate the floorplan data 225 without departing from the disclosure. For example, the device 110 may use one or more sensors to detect obstacles and/or walls in order to generate a floorplan, obstacle map, object map, and/or the like, which may collectively be referred to as the floorplan data 225. Thus, as the device 110 navigates around the environment by detecting and avoiding obstacles, the device 110 may generate and update the floorplan data 225 to identify locations associated with walls, furniture, and/or other obstacles. Additionally or alternatively, the device 110 may update the floorplan data 225 to indicate a type of obstacle (e.g., category associated with each obstacle) and/or additional data, depending on sensor capabilities associated with the device 110.

In other examples, the system 100 may perform the floorplan estimation 220 to generate the floorplan data 225 without departing from the disclosure. For example, the system 100 may combine information (e.g., sensor data) and/or processing from other devices in the environment, a smartphone associated with a user, and/or the system component(s) 120 to generate the floorplan data 225. Thus, the floorplan data 225 may be a collaborative effort involving the device 110 and one or more additional devices. Additionally or alternatively, the system 100 may generate the floorplan data 225 and the device 110 may simply receive the floorplan data 225 from the system component(s) 120 without departing from the disclosure.

As illustrated in FIG. 2, the system 100 may use the floorplan data 225 to perform target likelihood conversion 230 to generate likelihood data 235, which may correspond to the target likelihood estimates described above. In some examples, the system 100 may process the floorplan data 225 to calculate a likelihood value associated with each direction (e.g., azimuth index or range of azimuth values), although the disclosure is not limited thereto. For example, the device 110 may use the floorplan data 225 to determine a first likelihood value associated with a first direction (e.g., 0°), which may indicate a likelihood that the first direction corresponds to a target sound source associated with the acoustic event (e.g., wakeword).

To illustrate an example, the device 110 may determine that the first direction corresponds to a known obstacle (e.g., wall) in close proximity to the device 110 and may associate the first direction with a low likelihood value, indicating that the first direction is unlikely to correspond to a sound source such as the user (e.g., more likely to correspond to an acoustic reflection or reflected sound source). In contrast, the device 110 (i) may determine that a second direction does not correspond to a known obstacle (e.g., within a certain distance from the device 110) and/or (ii) may determine that a distance to the obstacle exceeds a threshold value (e.g., 2 meters, although the disclosure is not limited thereto). Thus, while the device 110 may not know whether the second direction corresponds to a sound source or not, the device 110 may determine that the second direction is unlikely to correspond to an acoustic reflection and may associate the second direction with a high likelihood value, indicating that the second direction may correspond to a sound source such as the user (e.g., less likely to correspond to an acoustic reflection or reflected sound source).

In the example described above, the floorplan data 225 is primarily used to rule out obvious reflections and avoid selecting an SSL track associated with a wall in proximity to the device 110. However, this is intended to conceptually illustrate a simple example and the disclosure is not limited thereto. In some examples, the device 110 may perform more sophisticated and/or nuanced target likelihood conversion and determine specific likelihood values based on a distance, type of obstacle, and/or additional information associated with each direction.

For ease of illustration, the example described above referred to the first direction as corresponding to a specific azimuth value (e.g., 0°). However, this is intended to conceptually illustrate a simple example and the disclosure is not limited thereto. Instead, depending on an accuracy (e.g., resolution, granularity, etc.) associated with beamforming, the first direction may correspond to a range of azimuth values without departing from the disclosure. For example, if beamforming is associated with a first resolution (e.g., 5°), the first direction would correspond to a range between −2.5° and 2.5°. Similarly, if beamforming is associated with a second resolution (e.g., 10°), the first direction would correspond to a range between −5° and 5°. In some examples, the first direction may be associated with an azimuth index instead of a specific range of azimuth values. For example, if beamforming is associated with the first resolution (e.g., 5°), the device 110 would divide the azimuth values into a total of 72 azimuth indexes. Similarly, if beamforming is associated with the second resolution (e.g., 10°), the device 110 would divide the azimuth values into a total of 36 azimuth indexes.

Figure 3:
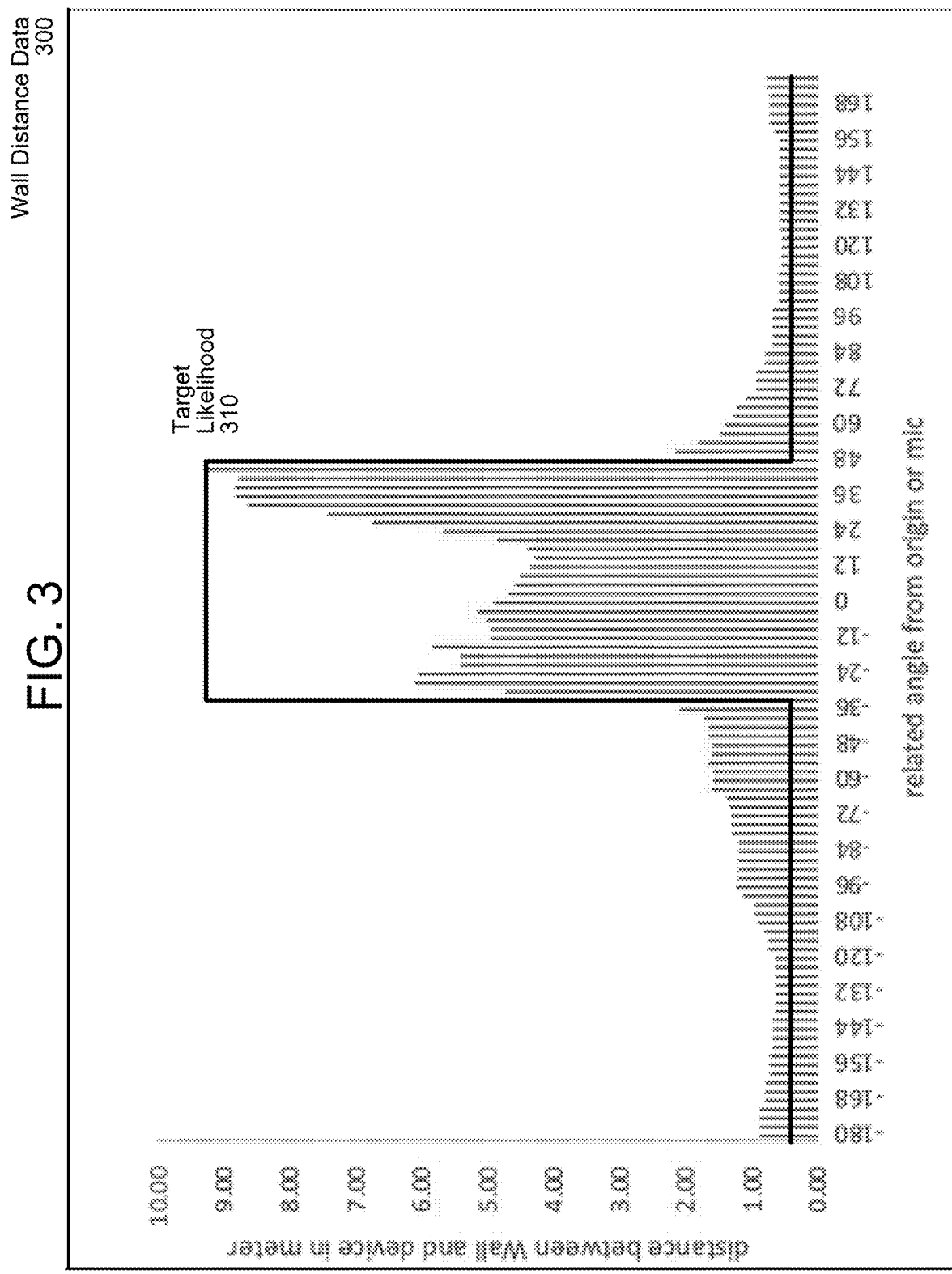
FIG. 3 illustrates an example of target likelihood data associated with wall distance data according to embodiments of the present disclosure.

FIG. 3 illustrates an example of target likelihood data associated with wall distance data according to embodiments of the present disclosure. As described above, the device 110 may use the floorplan data 225 to determine wall distance data 300 and may use the wall distance data 300 to determine target likelihood data 310 that corresponds to the wall distance data 300. In the example shown in FIG. 3, the wall distance data 300 is illustrated as a plurality of azimuth indexes along a horizontal axis and corresponding distance values along a vertical axis. For example, each azimuth index represents a particular direction relative to the device 110 and a corresponding distance value indicates a distance between the device 110 and a wall or other obstacle represented in the floorplan data 225.

As illustrated in FIG. 3, the wall distance data 300 includes a first number of azimuth indexes (e.g., 120 individual directions), which results in a first resolution (e.g., 3° for each azimuth index). For example, a first azimuth index may correspond to a first range of azimuth values (e.g., −180° to −177°), a second azimuth index may correspond to a second range of azimuth values (e.g., −177° to −174°), and so on until a $120^{th}$ azimuth index may correspond to a $120^{th}$ range of azimuth values (e.g., 1770 to 180°). However, the disclosure is not limited thereto and the specific azimuth values may vary without departing from the disclosure. For example, the first azimuth index may be centered on a first azimuth value (e.g., −180°), the second azimuth index may be centered on a second azimuth value (e.g., −177°), and so on, although the disclosure is not limited thereto. Additionally or alternatively, a number of azimuth indexes may vary without departing from the disclosure. For example, the device 110 may generate wall distance data that includes a second number of azimuth indexes (e.g., 60 individual directions), which results in a second resolution (e.g., 6° for each azimuth index), although the disclosure is not limited thereto.

As described above, the device 110 may use the wall distance data 300 to determine the target likelihood data 310. For example, the device 110 may use the wall distance data 300 to calculate likelihood estimate values for each direction around the device, with known objects (e.g., walls) corresponding to low likelihood values.

In some examples, the device 110 may determine the target likelihood data 310 using a simple technique such as thresholding. For example, the device 110 may assign a high likelihood value when a corresponding distance value exceeds a threshold value (e.g., 2 meters, although the disclosure is not limited thereto) and may assign a low likelihood value when a corresponding distance value is below the threshold value. However, the disclosure is not limited thereto and the device 110 may determine the target likelihood data 310 using other techniques without departing from the disclosure.

An example of this technique is illustrated in FIG. 3, as the target likelihood data 310 is represented using binary values, such that each azimuth index is associated with either a first binary value (e.g., 0) corresponding to the low likelihood values or a second binary value (e.g., 1) corresponding to the high likelihood values. For example, a first portion of the azimuth indexes (e.g., −180° to −36°) correspond to distance values that are below the threshold value (e.g., do not satisfy a condition) and are therefore associated with the first binary value. In contrast, a second portion of the azimuth indexes (e.g., −33° to 48°) correspond to distance values that exceed the threshold value (e.g., satisfy the condition) and are therefore associated with the second binary value. Finally, a third portion of the azimuth indexes (e.g., 480 to 180°) correspond to distance values that are below the threshold value (e.g., do not satisfy the condition) and are therefore associated with the first binary value.

In the example illustrated in FIG. 3, the target likelihood data 310 is easily broken into three segments using the threshold value. Therefore, for ease of illustration, the target likelihood data 310 is represented in FIG. 3 as a continuous line. However, the disclosure is not limited thereto and in some examples the target likelihood data 310 may correspond to a first number of likelihood values without departing from the disclosure. For example, each azimuth index may be associated with an individual likelihood value and there may be greater variations between neighboring azimuth values due to corresponding variations in distance values. Additionally or alternatively, the device 110 may determine the target likelihood data 310 using additional techniques without departing from the disclosure. For example, instead of corresponding to binary values, the target likelihood data 310 may correspond to three or more values and/or continuous values without departing from the disclosure.

As illustrated in FIG. 3, the target likelihood data 310 indicates that the first portion of the azimuth indexes (e.g., −180° to −36°) and the third portion of the azimuth indexes (e.g., 480 to 180°) correspond to smaller distance values, which indicates that walls or other obstacles are in proximity to the device 110. As a result, the device 110 may associate these azimuth indexes with low likelihood values, as any sound captured in these directions likely correspond to acoustic reflections and not direct sound. In contrast, the target likelihood data 310 indicates that the second portion of the azimuth indexes (e.g., −33° to 48°) correspond to larger distance values, which indicates that walls or other obstacles are not in proximity to the device 110. As a result, the device 110 may associate these azimuth indexes with high likelihood values, as sound captured in these directions likely corresponds to direct sound and not acoustic reflections.

Referring back to FIG. 2, in some examples the system 100 may determine the wall distance data 300 as part of performing the floorplan estimation 220, prior to performing target likelihood conversion 230. For example, the floorplan data 225 may include and/or correspond to the wall distance data 300 without departing from the disclosure. To illustrate an example, performing floorplan estimation 220 may include estimating floorplan information and converting this floorplan information to the wall distance values. In this example, the device 110 may perform the target likelihood conversion 230 by receiving the wall distance data 300 and using these distance values to calculate the target likelihood data 310.

The disclosure is not limited thereto, however, and in other examples the system 100 may instead determine the wall distance data 300 as part of performing the target likelihood conversion 230. For example, the floorplan data 225 may correspond to floorplan information indicating global coordinates associated with walls and other obstacles without departing from the disclosure. In this example, the device 110 may perform the target likelihood conversion 230 by receiving the floorplan information, converting the floorplan information to the wall distance data 300, and using these distance values to calculate the target likelihood data 310.

As illustrated in FIG. 2, the system 100 may also perform SSL processing 210 to generate the SSL data 215. For example, the device 110 may detect sound sources represented in audio data and may identify azimuth value(s) (e.g., relative direction) for each of the detected sound source(s). To illustrate an example, the device 110 may detect a first sound source (e.g., first portion of the audio data corresponding to a first direction relative to the device 110), a second sound source (e.g., second portion of the audio data corresponding to a second direction relative to the device 110), and so on, depending on a number of sound sources. Similar to the examples described above with regard to FIG. 3, the device 110 may associate each sound source (e.g., individual SSL tracks) with a direction relative to the device 110, which may correspond to a range of azimuth values, azimuth indexes, and/or the like without departing from the disclosure.

The system 100 may perform the SSL processing 210 using a variety of techniques without departing from the disclosure. For example, the device 110 may perform SSL processing by detecting sound sources based on peaks represented in the audio data. To illustrate an example, the device 110 may use a robust recursive algorithm to identify unique peaks represented in the audio data, although the disclosure is not limited thereto. In some examples, the device 110 may detect a unique peak based on configuration parameters (e.g., design preferences), such as a minimum peak-to-average ratio, a maximum peak width, and/or the like. For example, the device 110 may detect a first peak and associate the first peak with a sound source when a peak-to-average ratio associated with the first peak exceeds the minimum peak-to-average ratio and a peak width associated with the first peak is below the maximum peak width, although the disclosure is not limited thereto. A maximum number of peaks that the robust recursive algorithm can detect, along with a maximum number of iterations it can perform, are additional design parameters chosen by the device 110.

In some examples, the device 110 may process the audio data to determine energy values for each azimuth (e.g., angle) corresponding to 360 degrees around the device 110, with a peak indicating a sound source at that particular azimuth value or angle. While the examples described above refer to the device 110 determining an azimuth value associated with each peak or candidate sound source, the disclosure is not limited thereto. Instead, the device 110 may determine an azimuth value and an elevation value without departing from the disclosure. Thus, in some examples the device 110 may determine a three-dimensional (3D) direction associated with the candidate sound source. For ease of illustration, the following description will continue to refer to the azimuth value, but any reference to the azimuth value or a direction associated with the candidate sound source may include both azimuth and elevation without departing from the disclosure.

In some examples, the system 100 may be configured to group and track each sound source. For example, the system 100 may be configured to track a sound source over time, collecting information about the sound source and maintaining a position of the sound source relative to the device 110. Thus, the system 100 track the sound source even as the device 110 and/or the sound source move relative to each other. In some examples, the system 100 may determine a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

Figure 4:
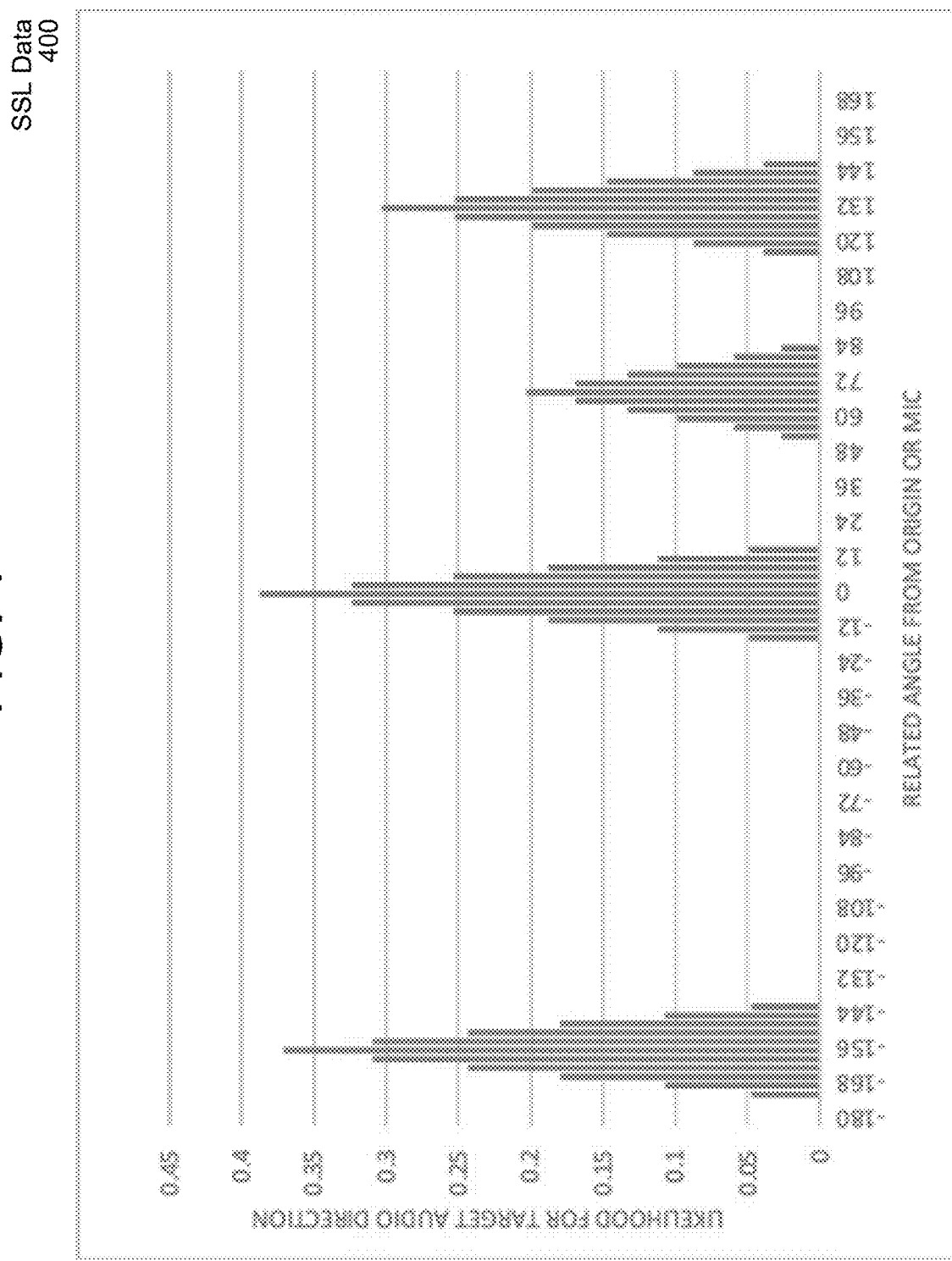
FIG. 4 illustrates an example of target likelihood data associated with sound source localization data according to embodiments of the present disclosure.

FIG. 4 illustrates an example of target likelihood data associated with sound source localization data according to embodiments of the present disclosure. As described above, the system 100 may perform SSL processing on input audio data to generate SSL data 400 indicating one or more sound sources represented in the input audio data (e.g., one or more SSL tracks). As illustrated in FIG. 4, the SSL data 400 may include target likelihood estimates for each direction around the device (e.g., 360 degrees) and/or individual sound source.

In the example shown in FIG. 4, the SSL data 400 is illustrated as a plurality of azimuth indexes along a horizontal axis and corresponding likelihood values along a vertical axis. For example, each azimuth index represents a particular direction relative to the device 110 and a corresponding likelihood value indicates a likelihood that the particular direction corresponds to a sound source.

As illustrated in FIG. 4, the SSL data 400 includes four distinct peaks, which corresponds to four different candidate sound sources. For example, a first peak is centered around a first azimuth value (e.g., −156°), a second peak is centered around a second azimuth value (e.g., 0°), a third peak is centered around a third azimuth value (e.g., 69°), and a fourth peak is centered around a fourth azimuth value (e.g., 132°). In some examples, the SSL data 400 may represent four unique sound sources, such that each candidate sound source corresponds to direct sound with no acoustic reflections. In other examples, however, the SSL data 400 may represent a combination of direct sound and acoustic reflections. For example, the SSL data 400 may only represent a single sound source, such that one candidate sound source corresponds to direct sound and the other three candidate sound sources correspond to acoustic reflections. Using only the SSL data 400, the device 110 may struggle to identify which of the four candidate sound sources corresponds to the direct sound and which correspond to reflected sound sources.

Referring back to FIG. 2, the system 100 may perform event detection 240 to generate event data 245. In some examples, the device 110 may perform event detection to detect an acoustic event represented in the audio data, and the event data 245 may indicate a start time, an end time, a type of acoustic event, and/or additional information associated with the detected event. For example, the device 110 may perform wakeword detection to detect a wakeword represented in the audio data and may generate the event data 245 indicating that a particular wakeword was detected during a specific time range (e.g., between a first time and a second time). However, the disclosure is not limited thereto, and in other examples the device 110 may perform any acoustic event detection without departing from the disclosure.

Additionally or alternatively, the device 110 may perform event detection using image data and/or other sensor data without departing from the disclosure. For example, the device 110 may generate image data representing a user and may perform computer vision processing using the image data to determine that the user is generating system-directed or device-directed speech (e.g., speaking directly to the device 110). However, the disclosure is not limited thereto and the device 110 may perform event detection using a combination of microphone audio data, image data, sensor data, motion data generated by a motion sensor (e.g., accelerometer), and/or the like without departing from the disclosure.

In response to detecting an event (e.g., acoustic event or image-based event), the device 110 may perform target goal detection to select a sound source that corresponds to the event (e.g., SSL track selection). As illustrated in FIG. 2, when the device 110 detects an event, the device 110 may generate the event data 245 and perform fusion processing 250 to generate fused likelihood data 255. For example, the device 110 may detect an acoustic event by performing wakeword detection and may fuse the target likelihood estimates generated using the SSL data 215 and/or the floorplan data 225 to generate the combined target likelihood estimate.

Figure 5:
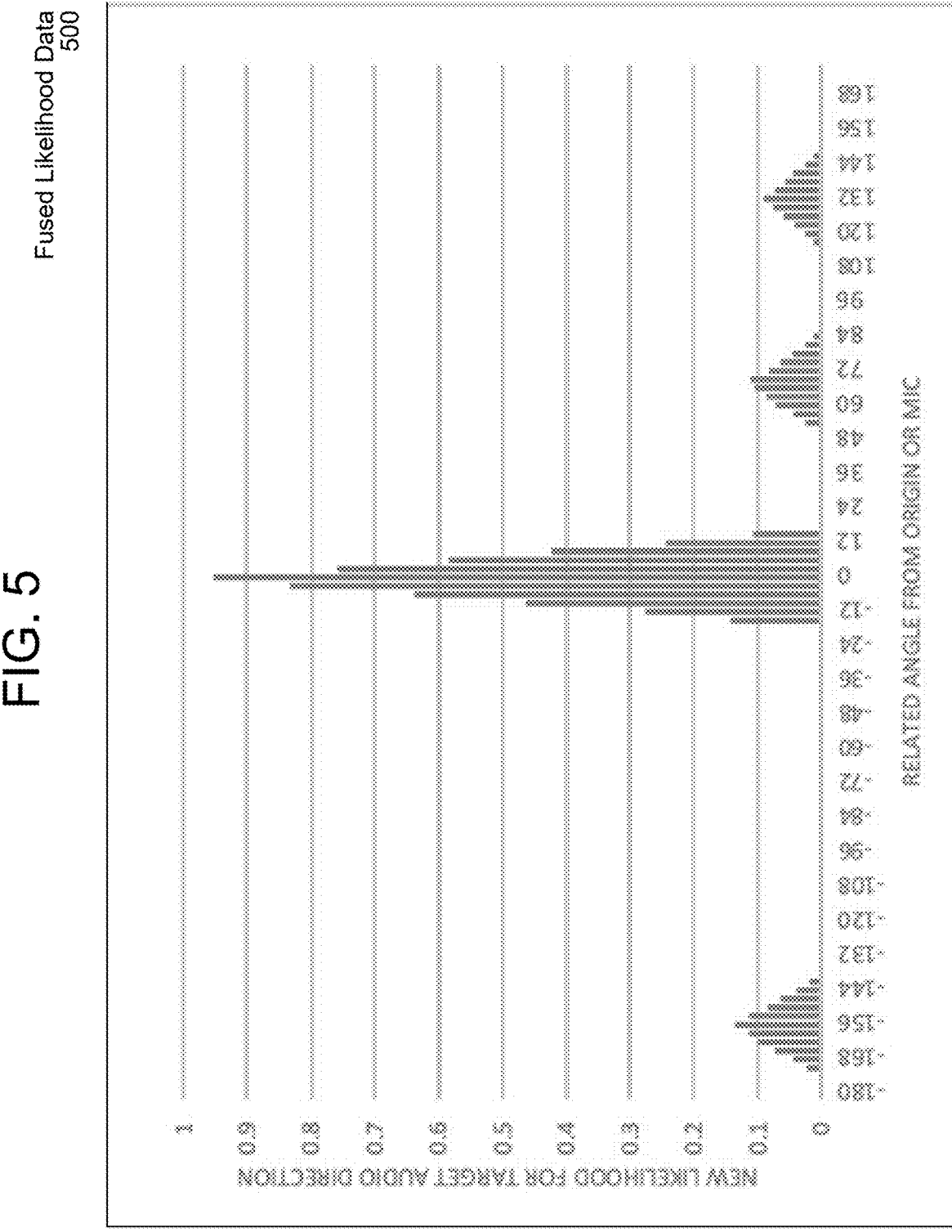
FIG. 5 illustrates an example of fused target likelihood data according to embodiments of the present disclosure.

FIG. 5 illustrates an example of fused target likelihood data according to embodiments of the present disclosure. As described above, the likelihood data 235 may associate known objects such as walls or other obstacles that are in proximity to the device 110 with low likelihood values. For example, as walls are acoustically reflective surfaces and do not correspond to a user or other sound source, walls in proximity to the device 110 are more likely to correspond to acoustic reflections (e.g., reflected sound sources) than direct sound. Thus, the combined target likelihood estimate enables the device to accurately associate the acoustic event with a corresponding SSL track (e.g., direct sound) and ignore reflections caused by objects in the environment.

Additionally or alternatively, the combined target likelihood estimate enables the device 110 to improve an accuracy and/or resolution of a direction associated with the SSL track, even without interference caused by acoustic reflections (e.g., no reflections are present). For example, SSL processing may be limited to a first resolution or margin of error (e.g., +/−10°), such that the device 110 may identify a sound source and associate the sound source with a first range of directions (e.g., sound source is located between 50°-70°). In contrast, object detection may be associated with a second resolution or margin of error (e.g., +/−2°), such that the combined target likelihood estimate may enable the device 110 to associate the sound source with a second range of directions (e.g., sound source is located between 58°-62°). Alternatively, the combined target likelihood estimate may indicate that a majority of the first range of directions is associated with a hard surface (e.g., wall or other obstacle), enabling the device 110 to select from objects detected within the first range of directions. For example, the device 110 may associate the sound source with a third range of directions (e.g., sound source is located between 50°-54°), although the disclosure is not limited thereto.

As described above, the device 110 may use the SSL data 215, the likelihood data 235, and/or the event data 245 to generate the fused likelihood data 255. In the example shown in FIG. 5, an example of fused likelihood data 500 is illustrated as a plurality of azimuth indexes along a horizontal axis and corresponding fused likelihood values along a vertical axis. For example, each azimuth index represents a particular direction relative to the device 110 and a corresponding fused likelihood value indicates a likelihood that this direction corresponds to a sound source (e.g., direct sound) associated with the detected event. Thus, the device 110 may perform target goal detection by performing target likelihood fusion and identifying a particular direction corresponding to the direct sound source.

As illustrated in FIG. 5, the fused likelihood data 500 includes four distinct peaks, which corresponds to four different candidate sound sources. For example, similar to the SSL data 400 described above, the fused likelihood data 500 includes a first peak centered around a first azimuth value (e.g., −156°), a second peak centered around a second azimuth value (e.g., 0°), a third peak centered around a third azimuth value (e.g., 69°), and a fourth peak centered around a fourth azimuth value (e.g., 132°).

In contrast to the SSL data 400, however, likelihood values associated with the first peak, the third peak, and the fourth peak are greatly reduced as a result of the target likelihood data 310. For example, the first peak, the third peak and the fourth peak correspond to low likelihood values due to respective distance values included in the wall distance data 300 not satisfying a condition (e.g., being below the threshold value). Thus, the first peak, the third peak, and the fourth peak correspond to walls in proximity to the device 110, which are more likely to correspond to acoustic reflections. In contrast, the second peak corresponds to an open area (e.g., walls extend away from the device 110) that is more likely to correspond to a sound source.

Based on the fused likelihood data 500, the device 110 would perform target goal detection by selecting a sound source and/or SSL track associated with the second peak. For example, while the second peak corresponds to a first likelihood value that is close to 1.0, the other peaks correspond to a second likelihood value that is closer to 0.1. Thus, the device 110 would associate the other peaks with acoustic reflections (e.g., reflected sound sources and/or reflected SSL tracks) while associating the second peak with a direct sound source and/or direct SSL track that corresponds to direct sound. For example, the device 110 may determine a second azimuth value corresponding to the second peak and associate the second azimuth value with the acoustic event represented in the event data 245.

As described in greater detail above, ideally the device 110 would select from the direct SSL tracks and not select one of the reflected SSL tracks. Thus, to avoid selecting one of the reflected SSL tracks, some conventional systems may remove the reflected SSL tracks entirely. However, if the device 110 misidentifies a direct SSL track as a reflected SSL track, removing all of the reflected SSL tracks may result in the device 110 selecting the wrong SSL track for the acoustic event.

Instead of removing the reflected SSL tracks completely, in some examples the device 110 may reduce a confidence score associated with a reflected SSL track. For example, the device 110 may set the confidence score to a first value (e.g., 0.5), an average of a track power value and a correlation value, and/or the like without departing from the disclosure. Thus, the device 110 may reduce the likelihood that the reflected SSL track is selected during SSL track selection, without discarding each of the reflected SSL tracks entirely. This is why the first peak, the third peak, and the fourth peak correspond to the second likelihood value that is closer to 0.1, instead of a value of 0.0. The disclosure is not limited thereto, however, and the second likelihood value may vary depending on a variety of parameters. For example, the second likelihood value may be greater than 0.1 without departing from the disclosure. Additionally or alternatively, the second likelihood value may vary between the first peak, the third peak, and the fourth peak without departing from the disclosure.

In the example described above, the combined target likelihood estimate may associate walls or other obstacles with a low likelihood value, reflecting that the target sound source corresponds to a user (e.g., target goal is to identify the user speaking to the device 110). However, the disclosure is not limited thereto, and in other examples the device 110 may a generate combined target likelihood estimate using different target sound source(s) and/or target goal(s) without departing from the disclosure. For example, the device 110 may detect an acoustic event associated with an object (e.g., glass breaking) and may fuse the target likelihood estimates generated using the SSL data 215 and/or the floorplan data 225 to generate a combined target likelihood estimate that identifies a potential source of the acoustic event, such as a window or other glass structure included in the floorplan. Thus, in this example the combined target likelihood estimate may identify walls or other objects (e.g., windows, doors, etc.) that include glass and associate these objects with a high likelihood value, reflecting that the target sound source corresponds to glass instead of a user.

For ease of illustration, FIG. 2 illustrates a conceptual example in which the system 100 combines the SSL data 215 with floorplan information such as floorplan data 225. For example, the system 100 may determine floorplan information, which may correspond to global coordinates associated with walls and other obstacles (e.g., obstacle map), and may convert the floorplan information into wall distance data, which represents a distance between the device 110 and a wall or other obstacle represented in the floorplan information for each of a plurality of directions (e.g., azimuth indexes). Thus, the system 100 may use the wall distance data to calculate a likelihood estimate for each of the plurality of directions, which can be combined with the SSL data 215 to generate the fused likelihood data 255 associated with the event data 245.

The disclosure is not limited thereto, however, and in other examples the system 100 may combine the SSL data 215 with object information without departing from the disclosure. For example, the system 100 may perform object detection to detect and/or track a plurality of different objects. While the object information may include objects such as the walls and other obstacles included in the floorplan information, it may also include additional objects that do not correspond to obstacles and/or may be movable in the environment. In some examples, the objects may include humans, pets, and/or other potential sound sources without departing from the disclosure. Thus, unlike walls and other obstacles, some objects included in the object information may be associated with a high likelihood value, indicating that the object may be a sound source.

Figure 6:
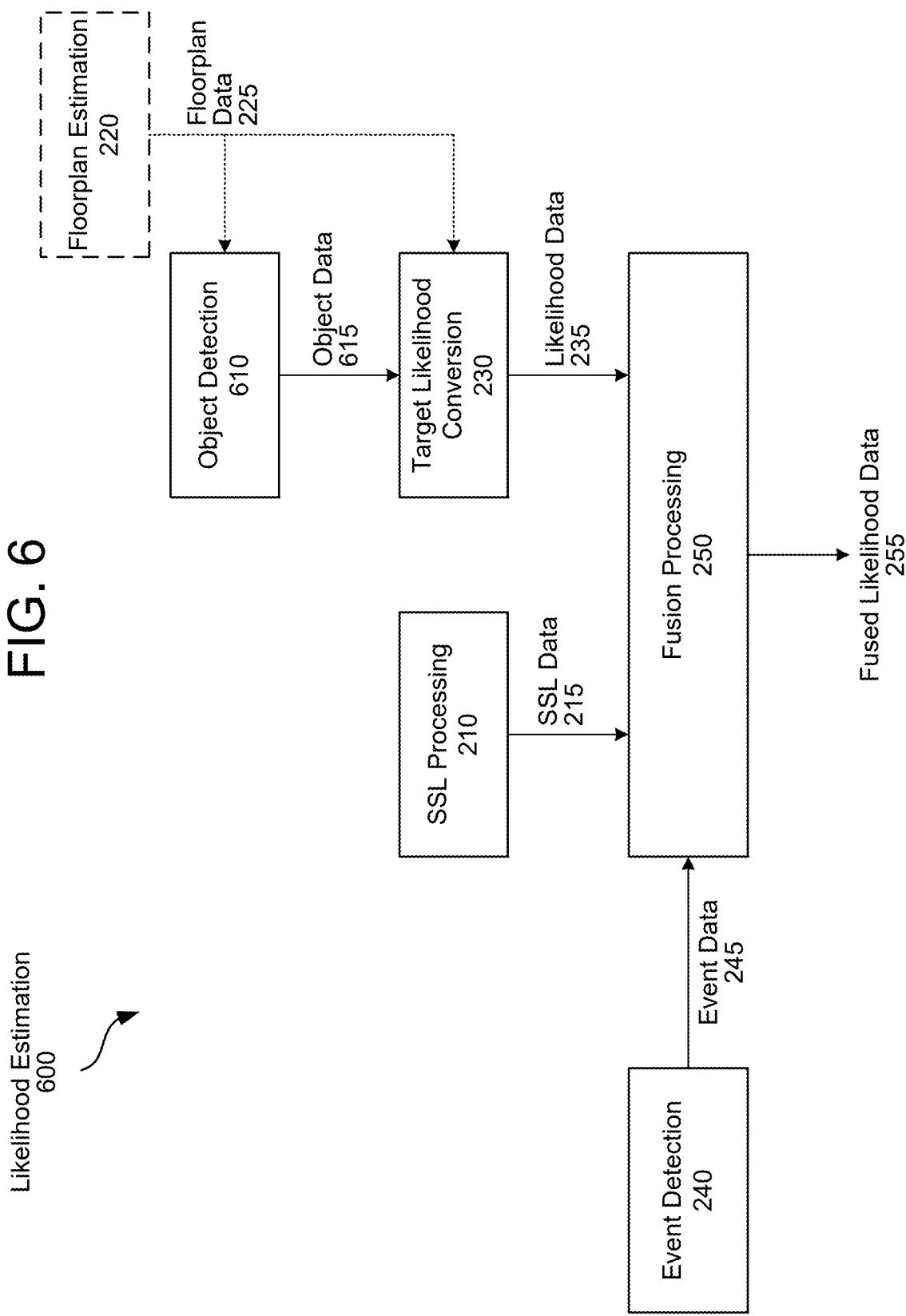
FIG. 6 is a block diagram illustrating an example of performing target goal detection using object detection data according to embodiments of the present disclosure.

FIG. 6 is a block diagram illustrating an example of performing target goal detection using object detection data according to embodiments of the present disclosure. As illustrated in FIG. 6, the system 100 may perform likelihood estimation 600 to combine object information with the SSL data 215 to generate the fused likelihood data 255. For example, the system 100 may perform object detection 610 to generate object data 615 corresponding to one or more objects in proximity to the device 110. The system 100 may perform object detection using a variety of sensors associated with the device 110. For example, the device 110 may include an image sensor configured to generate image data and may perform computer vision processing using the image data to perform object detection. The disclosure is not limited thereto, however, and the device 110 may perform object detection using additional inputs and/or sensors without departing from the disclosure.

In some examples, performing object detection 610 may include identifying walls and other obstacles that may be included in the floorplan data 225. For example, the device 110 may detect and track walls and other obstacles just like other objects, such that the object data 615 includes object information associated with individual walls/obstacles. Thus, the device 110 may perform object detection 610 and/or floorplan estimation 220 in a variety of different ways.

In a first example, the device 110 may perform object detection 610 instead of performing floorplan estimation 220. For example, the device 110 may generate the object data 615 by detecting and tracking a plurality of objects, which may include the walls and/or obstacles. Thus, the walls and/or obstacles correspond to a subset of the object data 615, such that the object data 615 includes the floorplan information and can be used instead of the floorplan data 225.

In a second example, the device 110 may perform floorplan estimation 220 as part of performing object detection 610. For example, the device 110 may generate the object data 615 by detecting and tracking a plurality of objects, which may include the walls and/or obstacles. Thus, the device 110 may use the object data 615 to generate the floorplan data 225 without departing from the disclosure. For example, the device 110 may identify walls and/or other obstacles represented in the object data 615 and use these objects to perform floorplan estimation 220 and generate the floorplan data 225.

In a third example, the device 110 may perform both floorplan estimation 220 and object detection 610 while sharing information between the two. For example, the device 110 may perform floorplan estimation 220 to generate the floorplan data 225 and may use the floorplan data 225 as an input to object detection 610. Additionally or alternatively, the device 110 may perform object detection 610 to generate the object data 615 and may use the object data 615 as an input to floorplan estimation 220. For example, the device 110 may update the floorplan data 225 using the object data 615 and/or may update the object data 615 using the floorplan data 225 without departing from the disclosure.

In a fourth example, the device 110 may perform floorplan estimation 220 and object detection 610 independently. For example, the device 110 may perform floorplan estimation 220 separately from the object detection 610 and may perform target likelihood conversion 230 using both the object data 615 and the floorplan data 225, although the disclosure is not limited thereto.

As floorplan estimation 220 may be incorporated as part of object detection and/or performed separately, and the floorplan data 225 may be input to object detection 610 and/or target likelihood conversion 230, FIG. 6 illustrates the floorplan estimation 220 and the floorplan data 225 using dashed and dotted lines to indicate that these steps are optional and may vary without departing from the disclosure.

In some examples, the device 110 may perform target likelihood conversion 230 individually for each object represented in the object data 615 and/or the floorplan data 225. Thus, while FIGS. 3-5 illustrate an example in which the device 110 performs fusion processing 250 to combine the SSL data 215 with likelihood data 235 that corresponds to a single set of target likelihood values (e.g., target likelihood data 310), the disclosure is not limited thereto. Instead, the fusion processing 250 may receive multiple sets of target likelihood values and may combine them with the SSL data 215 to generate the fused likelihood data 255 without departing from the disclosure.

As described above, the device 110 may perform object detection 610 using one or more sensors without departing from the disclosure. For example, the device 110 may include an image sensor configured to generate image data and the device 110 may perform computer vision processing using the image data to detect and track objects represented in the image data. Additionally or alternatively, the device 110 may include additional sensors (e.g., accelerometer, depth sensor, and/or the like) and may use sensor data generated by these sensors to improve the object detection 610. For example, the device 110 may use distance measurements generated by a depth sensor to accurately determine a distance associated with an object detected in the image data, although the disclosure is not limited thereto. Thus, in some examples the device 110 may perform object detection 610 using sensor data that is not illustrated in FIG. 6 to generate the object data 615.

In other examples, however, the device 110 may use sensor data generated by these additional sensors during target likelihood conversion 230 without departing from the disclosure. For example, the device 110 may perform the target likelihood conversion 230 to generate the likelihood data 235 using a variety of sensor inputs and/or other information.

Figure 7:
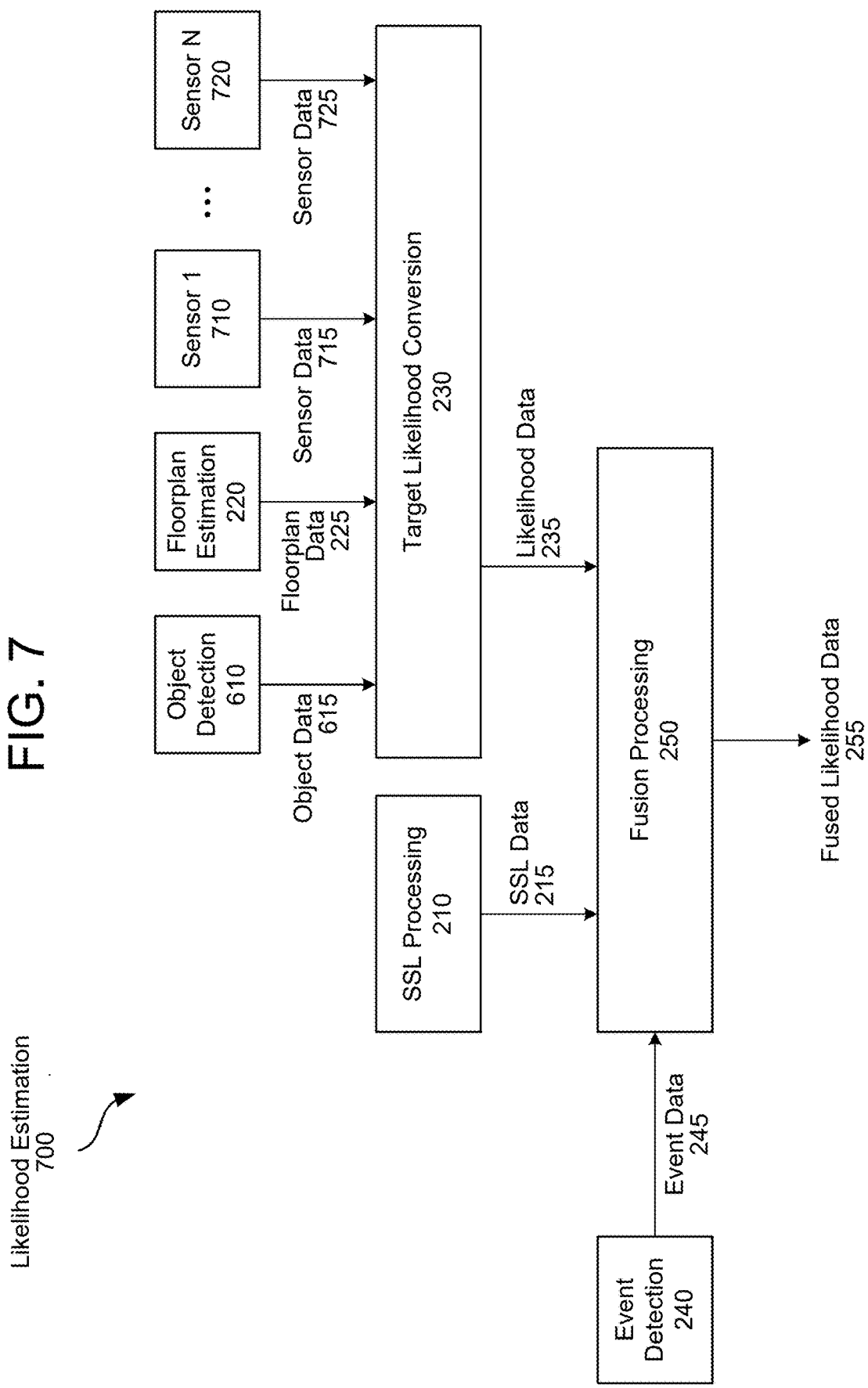
FIG. 7 is a block diagram illustrating an example of performing target goal detection using multiple inputs according to embodiments of the present disclosure.

FIG. 7 is a block diagram illustrating an example of performing target goal detection using multiple inputs according to embodiments of the present disclosure. As illustrated in FIG. 7, the device 110 may perform likelihood estimation 700 by generating likelihood data 235 using a variety of inputs. For example, the device 110 may generate the likelihood data 235 by performing target likelihood conversion 230 using the object data 615, the floorplan data 225, sensor data corresponding to one or more additional sensors (e.g., sensor data 715 generated by Sensor 1 710, sensor data 725 generated by Sensor N 720, etc.), additional input data, and/or the like without departing from the disclosure.

In some examples, the sensor data may correspond to distance measurements generated by a depth sensor associated with the device 110. In other examples, the sensor data may correspond to accelerometer data (e.g., motion data) generated by an accelerometer component of the device 110 and may therefore represent motion of the device 110. However, the disclosure is not limited thereto, and the sensor data may correspond to other sensors without departing from the disclosure. Additionally or alternatively, the sensor data may correspond to multiple sensors and the device 110 may process sensor data independently for each sensor without departing from the disclosure.

As used herein, an amount and/or type(s) of object information available to the device 110 is design-specific and varies between unique device configurations (e.g., device model, type of device, etc.) based on a number of sensor(s) and/or processing capabilities associated with the device 110. For example, the number of sensors, type of sensors, accuracy (e.g., reliability, resolution, etc.) associated with sensor data, an amount of processing capacity, and/or the like may vary without departing from the disclosure. Additionally or alternatively, an accuracy and/or resolution associated with the SSL data may vary depending on a number and/or location of microphones in a microphone array, an amount of processing capacity, and/or the like without departing from the disclosure. For example, in some examples the device 110 may include a microphone array that includes eight microphones, but the disclosure is not limited thereto and in other examples a number of microphones may vary without departing from the disclosure.

As described above, in some examples the device 110 may detect an acoustic event and may generate the fused likelihood data 255 in order to select a sound source corresponding to the acoustic event. For example, the device 110 may be configured to perform wakeword detection, such that when a wakeword is detected, the device 110 is configured to supplement the SSL data 215 with the likelihood data 235 to identify a source of the wakeword. Thus, the device 110 augments SSL processing with the object information and/or other sensor data to improve an accuracy and/or selection associated with SSL processing. The disclosure is not limited thereto, however, and in other examples the device 110 may use the SSL data 215 to supplement the likelihood data 235 without departing from the disclosure. For example, the device 110 may be configured to perform human detection, which may be primarily performed using object information represented in the object data 615. In this example, the device 110 may augment object detection with the SSL information and/or other sensor data to improve an accuracy associated with performing human detection, although the disclosure is not limited thereto.

Figure 8:
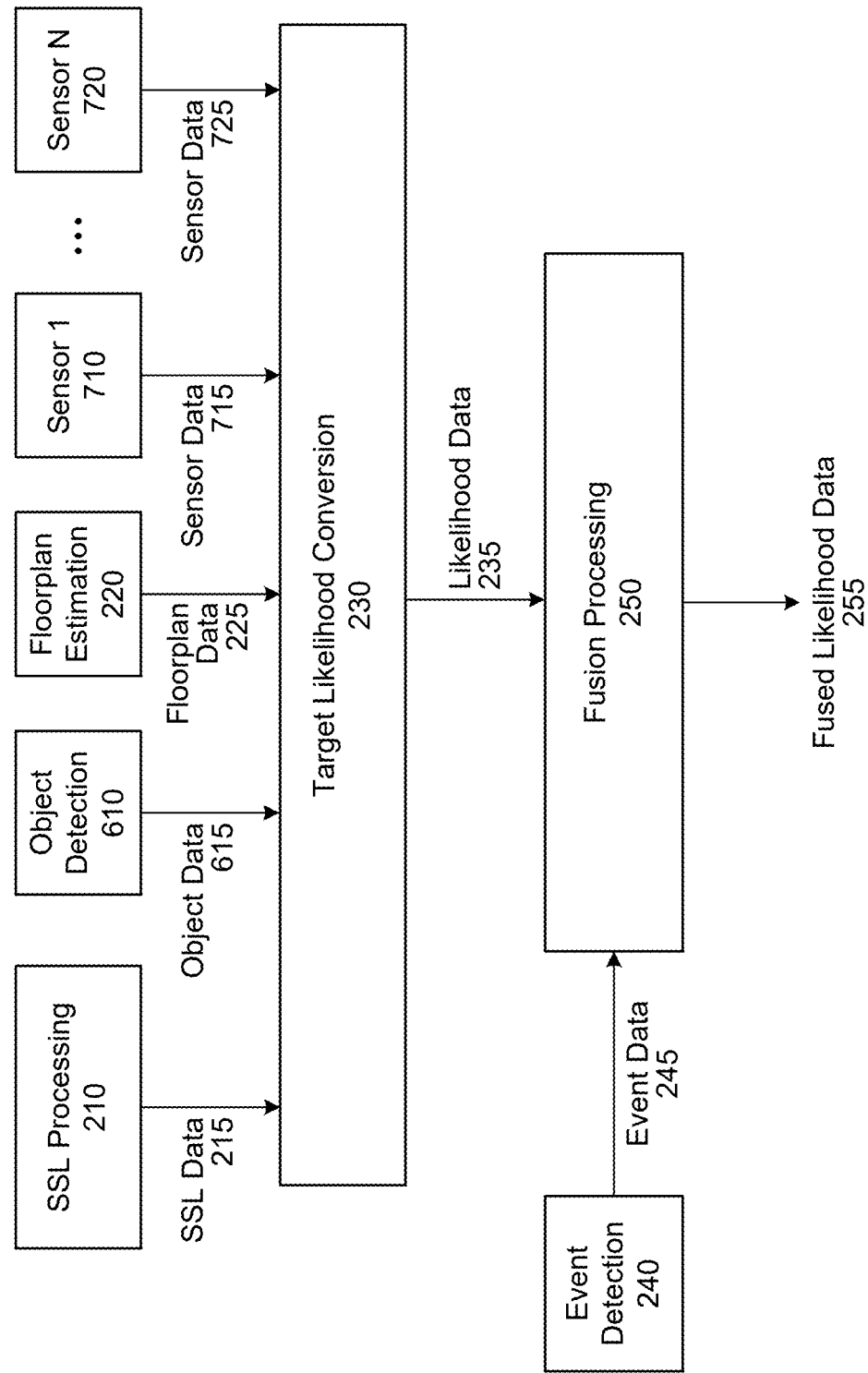
FIG. 8 is a block diagram illustrating an example of performing target goal detection using multiple inputs according to embodiments of the present disclosure.

FIG. 8 is a block diagram illustrating an example of performing target goal detection using multiple inputs according to embodiments of the present disclosure. As illustrated in FIG. 8, in some examples the device 110 may perform likelihood estimation 800 by generating the likelihood data 235 using the SSL data 215 along with a variety of inputs. Thus, instead of generating the likelihood data 235 separately from the SSL data 215 and then combining the SSL data 215 and the likelihood data 235 during fusion processing 250, the device 110 may use the SSL data 215 to generate the likelihood data 235. For example, the device 110 may generate the likelihood data 235 by performing target likelihood conversion 230 using the SSL data 215, the object data 615, the floorplan data 225, sensor data corresponding to one or more additional sensors (e.g., sensor data 715 generated by Sensor 1 710, sensor data 725 generated by Sensor N 720, etc.), additional input data, and/or the like without departing from the disclosure.

In some examples, the likelihood data 235 may include a set of likelihood values for each individual input or type of input. For example, the likelihood data 235 may include a first set of likelihood values corresponding to the SSL data 215, a second set of likelihood values corresponding to a first object represented in the object data 615, a third set of likelihood values corresponding to a second object represented in the object data 615, a fourth set of likelihood values corresponding to the floorplan data 225, and so on for each of the inputs processed while performing target likelihood conversion 230. In this example, the device 110 may perform fusion processing 250 by generating the fused likelihood data 255 using multiple sets of likelihood values. For example, in response to receiving the event data 245 and/or based on the event data 245 (e.g., start time, end time, and/or type of event), the device 110 may identify a portion of the likelihood data 235 that is relevant to the detected event and may generate the fused likelihood data 255 using the portion of the likelihood data 235.

In other examples, however, the likelihood data 235 may include a single set of likelihood values corresponding to two or more inputs without departing from the disclosure. To illustrate a first example, the device 110 may generate combined likelihood values corresponding to two or more objects represented in the object data 615. For example, the device 110 may group similar objects together and generate a single set of likelihood values for the group of objects instead of generating multiple sets of likelihood values. Additionally or alternatively, the device 110 may generate combined likelihood values corresponding to the SSL data 215, one or more objects represented in the object data 615, the floorplan data 225, and/or the like without departing from the disclosure. For example, the device 110 may identify stationary objects or obstacles represented in the object data 615 and/or the floorplan data 225 and may generate a single set of likelihood values for all potential obstacles or walls without departing from the disclosure.

While FIGS. 2 and 6-8 illustrate the device 110 performing target likelihood conversion 230 and fusion processing 250 as separate steps, the disclosure is not limited thereto. Thus, in some examples the device 110 may perform target likelihood conversion 230 to generate the likelihood data 235 and may separately perform fusion processing 250 using the likelihood data 235. However, the disclosure is not limited thereto and in other examples the device 110 may perform target likelihood conversion 230 as part of performing fusion processing 250. For example, the device 110 may store at least a portion of the SSL data 215, the object data 615, the floorplan data 225, the sensor data, and/or additional information in buffer component(s) of the device 110 until an event is detected. Thus, in response to receiving the event data 245 (e.g., detecting the event), the device 110 may perform fusion processing 250 by generating likelihood data 235 using the data stored in the buffer component(s). For example, this enables the device 110 to generate the likelihood data 235 based on information specific to the event, such as the type of event and/or a time window associated with the event (e.g., data collected between the start time and the end time associated with the event).

Figure 9:
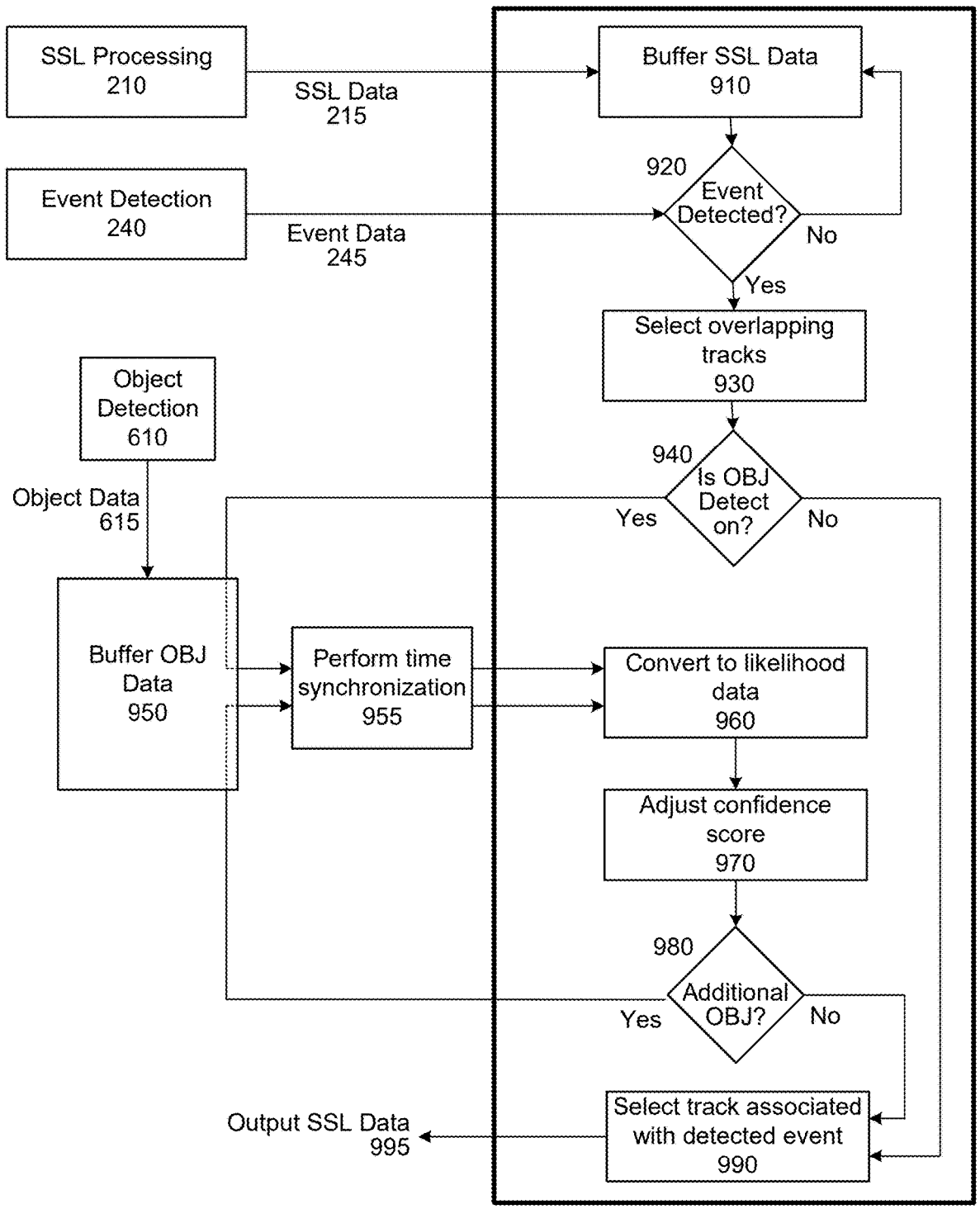
FIG. 9 is a block diagram illustrating an example of performing target goal detection in response to detecting an event according to embodiments of the present disclosure.

FIG. 9 is a block diagram illustrating an example of performing target goal detection in response to detecting an event according to embodiments of the present disclosure. As performing SSL processing 210 to generate SSL data 215, performing event detection 240 to generate event data 245, and performing object detection 610 to generate object data 615 are described extensively above, a redundant description is omitted.

As illustrated in FIG. 9, in some examples the device 110 may buffer (910) a portion of the SSL data 215 until an event is detected. For example, the device 110 may store a most recent portion of the SSL data 215 in a first buffer component, such as a circular buffer, which is configured to replace (e.g., overwrite) oldest SSL data with newest SSL data each time SSL processing 210 is performed.

While the data stored in the first buffer component is continuously updated as new SSL data 215 is generated, the device 110 only retrieves data from the first buffer component if an event is detected. For example, the device 110 may periodically determine (920) whether an event is detected and, if not, will loop to step 910 and continue to buffer the SSL data 215. When the device 110 detects an event and generates event data 245 corresponding to the detected event, however, the device 110 may select (930) overlapping tracks from the SSL data 215 stored in the first buffer component. In some examples, the device 110 may determine a time window associated with the detected event and may only select from the first buffer component a portion of SSL tracks that overlap with the time window. For example, the device 110 may determine the time window based on a start time and end time represented in the event data 245 and may select one or more SSL tracks that are active during this time window (e.g., energy levels exceed an energy threshold value).

As illustrated in FIG. 9, the device 110 may determine (940) whether object detection is being performed (e.g., "Is OBJ Detect on?") and, if not, may loop to step 995 without performing fusion processing. If object detection is being performed, however, the device 110 may buffer (950) the object data 615 until an event is detected, as described above with regard to buffering the SSL data 215. For example, the device 110 may store a most recent portion of the object data 615 in a second buffer component, such as a circular buffer, which is configured to replace (e.g., overwrite) oldest object data with newest object data each time object detection processing 610 is performed.

While the data stored in the second buffer component is continuously updated as new object data 615 is generated, the device 110 only retrieves data from the second buffer component if an event is detected. For example, after determining that the event is detected in step 920 and selecting overlapping SSL tracks in step 930, the device 110 may retrieve at least a portion of the object data 615 stored in the second buffer component in step 950.

In some examples, the device 110 may select a portion of the object data 615 from the second buffer component based on the detected event. For example, depending on the type of event and/or the time window associated with the event, the device 110 may select a certain type of object data 615 and/or a portion of the object data 615 generated during the time window, although the disclosure is not limited thereto.

As illustrated in FIG. 9, the device 110 may perform (955) time synchronization to generate synchronized timestamps for all of the object data 615 stored in the second buffer and/or select a portion of the object data 615 associated with the detected event. While FIG. 9 illustrates time synchronization as a discrete step performed in response to the detected event, the disclosure is not limited thereto and the device 110 may perform time synchronization prior to and/or as part of storing the object data 615 in the second buffer without departing from the disclosure. Thus, the device 110 may perform time synchronization at any time, such that the object data 615 stored in the second buffer is synchronized with the SSL data 215 and/or the event data 245. Additionally or alternatively, while FIG. 9 only illustrates that the device 110 performs time synchronization for the object data 615 stored in the second buffer, the disclosure is not limited thereto and the device 110 may perform time synchronization using the SSL data 215, the event data 245, and/or any additional data without departing from the disclosure. Thus, an important aspect of performing fusion processing may include performing time synchronization to synchronize each individual set of data or information generated by a plurality of discrete components associated with the device 110. For example, the device 110 may associate each individual set of data or information with a global clock, synchronized timestamp, and/or the like, enabling the device 110 to accurately identify data generated during a specific time window.

Using the selected portion of the object data 615, the device 110 may convert (960) the object data 615 to likelihood data, as described in greater detail above with regard to generating the likelihood data 235, and may adjust (970) confidence score(s) based on the likelihood data, as described in greater detail above with regard to generating the fused likelihood data 255. For example, the device 110 may convert the object data 615 to likelihood data using the techniques described above with regard to performing target likelihood conversion 230, although the disclosure is not limited thereto. Additionally or alternatively, the device 110 may adjust the confidence score(s) based on the likelihood data using the techniques described above with regard to performing fusion processing 250, although the disclosure is not limited thereto.

In some examples, the device 110 may determine (980) whether there is additional object data available and, if so, may retrieve this additional object data from the second buffer component and repeat steps 960-970. For example, the device 110 may iteratively perform steps 960-970 for each object represented in the object data 615, although the disclosure is not limited thereto. Additionally or alternatively, the device 110 may determine whether there are other types of object information and/or additional sensor information available in the second buffer component and may iteratively perform steps 960-970 for each type of object information without departing from the disclosure.

For ease of illustration, FIG. 9 only depicts the device 110 buffering and retrieving the object data 615 in order to conceptually illustrate a simple example. However, the disclosure is not limited thereto and the device 110 may store and retrieve a variety of inputs, sensor data, and/or the like without departing from the disclosure. For example, the second buffer component may store the object data 615, the floorplan data 225, sensor data generated by one or more sensors, and/or any information described above with regard to performing target likelihood conversion 230.

In some examples, the confidence score(s) adjusted in step 980 may correspond to the fused likelihood data 255 generated while performing fusion processing 250. For example, the device 110 may generate an initial set of confidence scores and then iteratively update this set of confidence scores based on the likelihood data associated with each object. Thus, the final confidence score(s) may indicate a plurality of likelihood values, similar to the fused likelihood data 500 illustrated in FIG. 5.

Using these final confidence score(s) (e.g., plurality of likelihood values), the device 110 may select (990) a track (e.g., SSL track) associated with the detected event and may output (995) SSL data corresponding to the selected SSL track. In some examples, the device 110 may output a portion of the SSL data 215 that represents the selected SSL track. The disclosure is not limited thereto, however, and in other examples the device 110 may output a portion of the audio data that corresponds to the selected SSL track without departing from the disclosure. For example, the device 110 may perform beamforming to generate beamformed audio data corresponding to a direction associated with the selected SSL track and may output the beamformed audio data to a downstream component for additional processing.

While FIGS. 8-9 illustrate examples in which the device 110 performs fusion processing 250 as part of performing event detection and/or in response to receiving event data 245, the disclosure is not limited thereto. In some examples, the device 110 may perform fusion processing 250 periodically without performing event detection without departing from the disclosure. For example, the device 110 may be configured to continuously combine all of the various input signals to generate fused likelihood data 255 without needing an event to trigger fusion processing.

Figure 10:
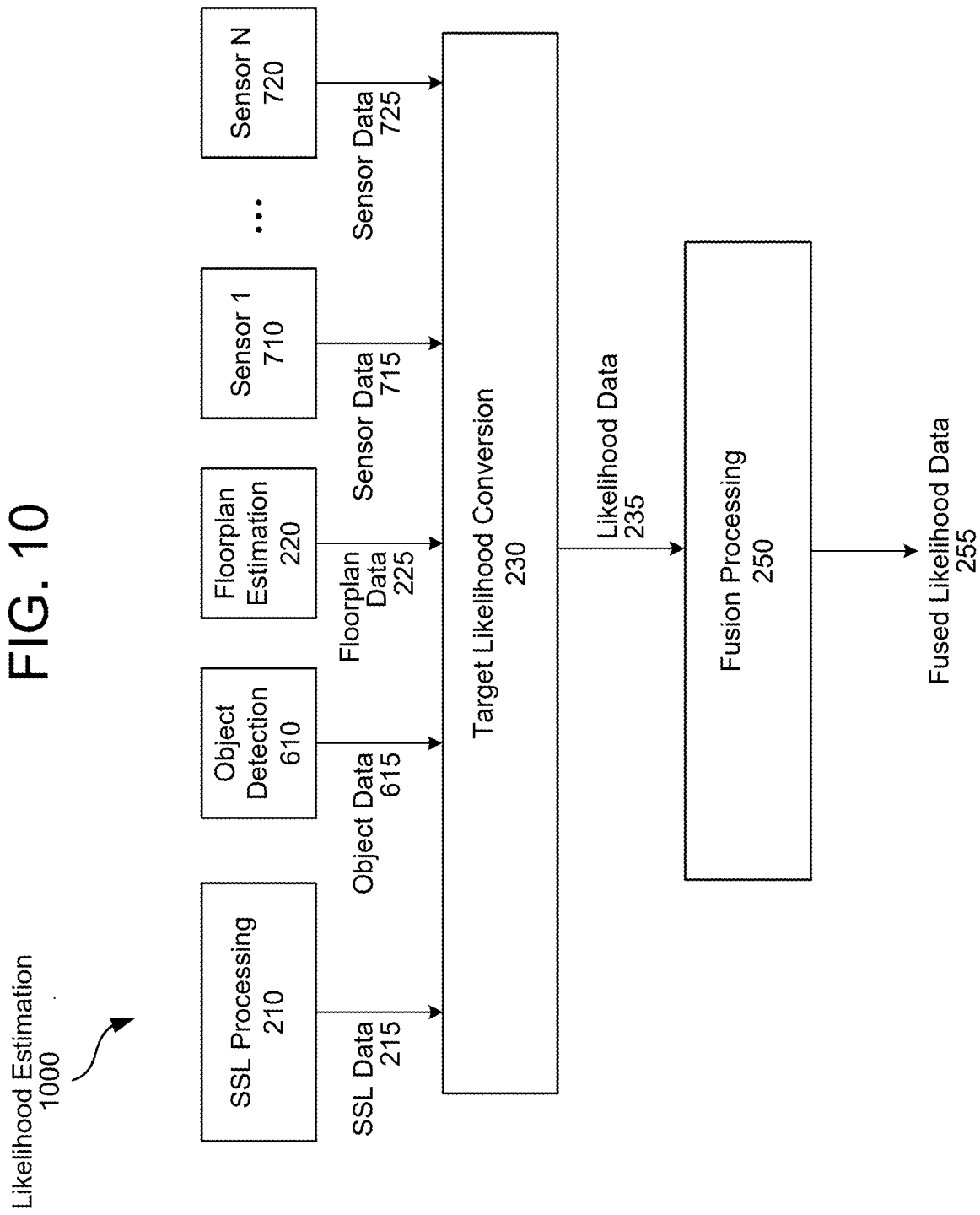
FIG. 10 is a block diagram illustrating an example of performing target goal detection using multiple inputs according to embodiments of the present disclosure.

FIG. 10 is a block diagram illustrating an example of performing target goal detection using multiple inputs according to embodiments of the present disclosure. As illustrated in FIG. 10, the device 110 may perform likelihood estimation 1000 without needing an event to trigger fusion processing 250 and/or performing event detection 240. For example, the device 110 may perform the same steps described above with regard to FIG. 8 on a fixed schedule to periodically generate the fused likelihood data 255. The disclosure is not limited thereto, however, and the device 110 may generate the fused likelihood data 255 continuously, intermittently, periodically, and/or in response to certain conditions that are distinct from the event data 245. For example, the device 110 may perform fusion processing 250 in response to detecting a loud sound, detecting a user device in proximity to the device 110, and/or the like. In contrast to the event data 245 described above, these triggers may not be associated with an end time and/or a type of event, such that the device 110 generates the fused likelihood data 255 in response to any external stimuli instead of a specific event.

Figure 11:
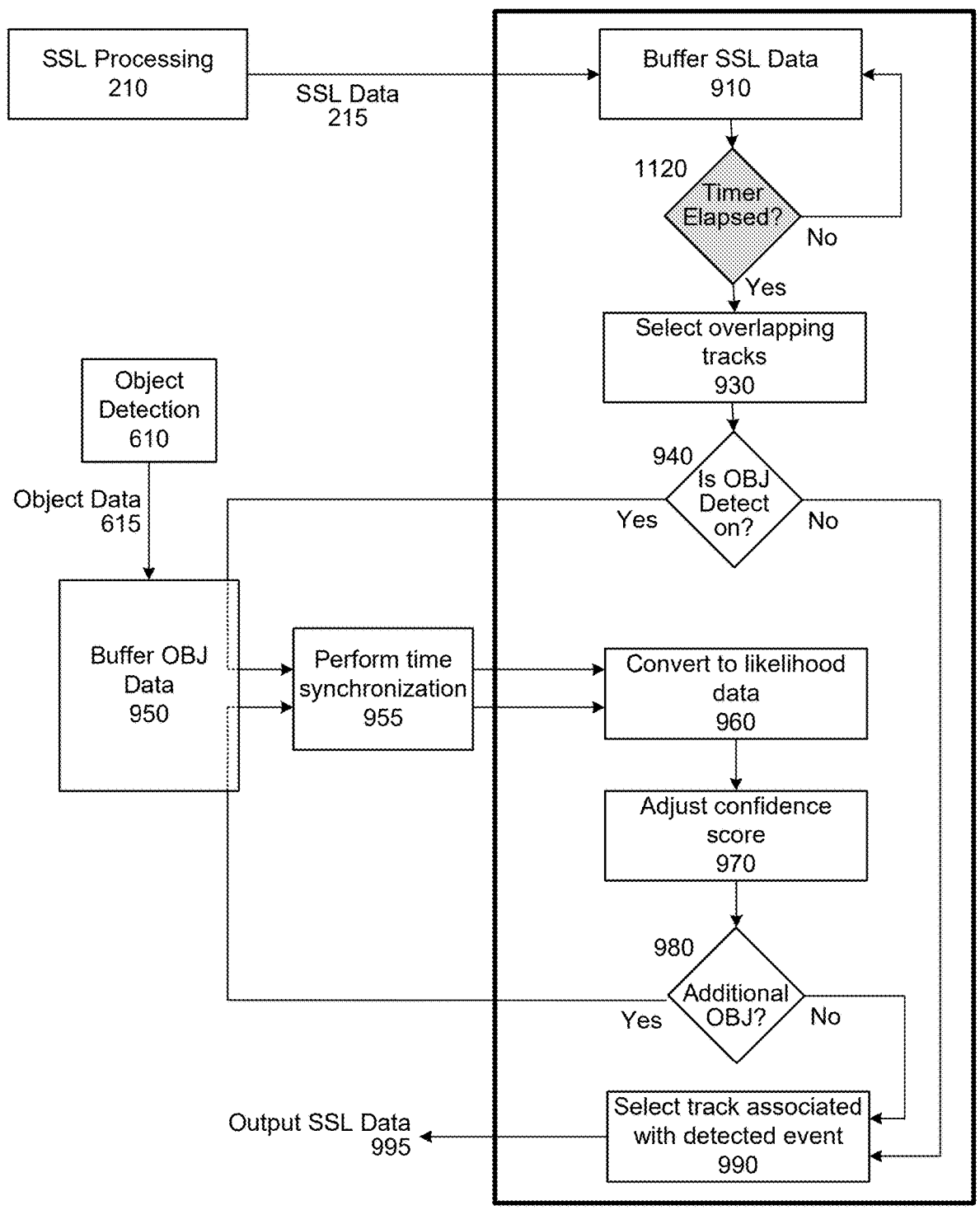
FIG. 11 is a block diagram illustrating an example of performing target goal detection periodically according to embodiments of the present disclosure.

FIG. 11 is a block diagram illustrating an example of performing target goal detection periodically according to embodiments of the present disclosure. As most of the steps illustrated in FIG. 11 were described above with regard to FIG. 9, a redundant description is omitted. Thus, the only difference between FIG. 9 and FIG. 11 is the omission of event detection 240 and/or event data 245.

As illustrated in FIG. 11, instead of generating the output SSL data 995 in response to a detected event, in some examples the device 110 may generate the output SSL data 995 periodically. For example, the device 110 may buffer (910) a portion of the SSL data 215 until a timer has elapsed and/or the like. Thus, the device 110 may store a most recent portion of the SSL data 215 in a first buffer component, such as a circular buffer, which is configured to replace (e.g., overwrite) oldest SSL data with newest SSL data each time SSL processing 210 is performed.

After the timer has elapsed, or some other periodic event is triggered, the device 110 may select (930) overlapping tracks from the SSL data 215 stored in the first buffer component. In some examples, the device 110 may determine a time window associated with the periodic event and may only select from the first buffer component a portion of SSL tracks that overlap with the time window. For example, the device 110 may determine the time window to include all SSL tracks since a previous periodic event, such that the device 110 selects any active SSL tracks and/or new SSL tracks stored in the first buffer component since the previous periodic event. Additionally or alternatively, the periodic event may be intermittent and associated with a fixed time window, such that any loud noises result in the device 110 selecting a portion of the first buffer component corresponding to the fixed time window (e.g., SSL tracks active within a previous 5 seconds). Thus, the periodic event may be associated with a fixed time window (e.g., every 5 seconds), a variable time window (e.g., every loud noise), and/or the like without departing from the disclosure.

While the examples described above refer to the device 110 performing fusion processing 250 in general, the specific processing associated with performing fusion processing 250 may vary without departing from the disclosure. For example, while FIGS. 2, 6-8, and 10 illustrate fusion processing 250 as a single step, performing fusion processing 250 may include two or more steps without departing from the disclosure.

Figure 12A:
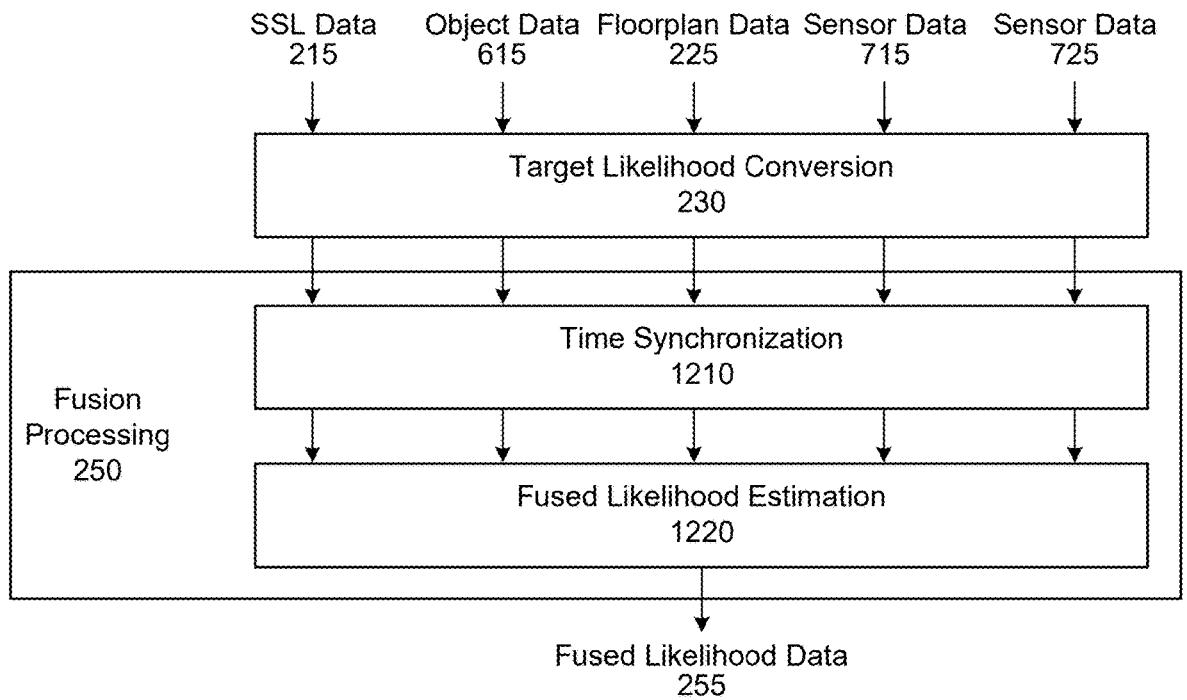
FIGS. 12A-12B are block diagram illustrating example of performing fusion processing according to embodiments of the present disclosure.
Figure 12B:
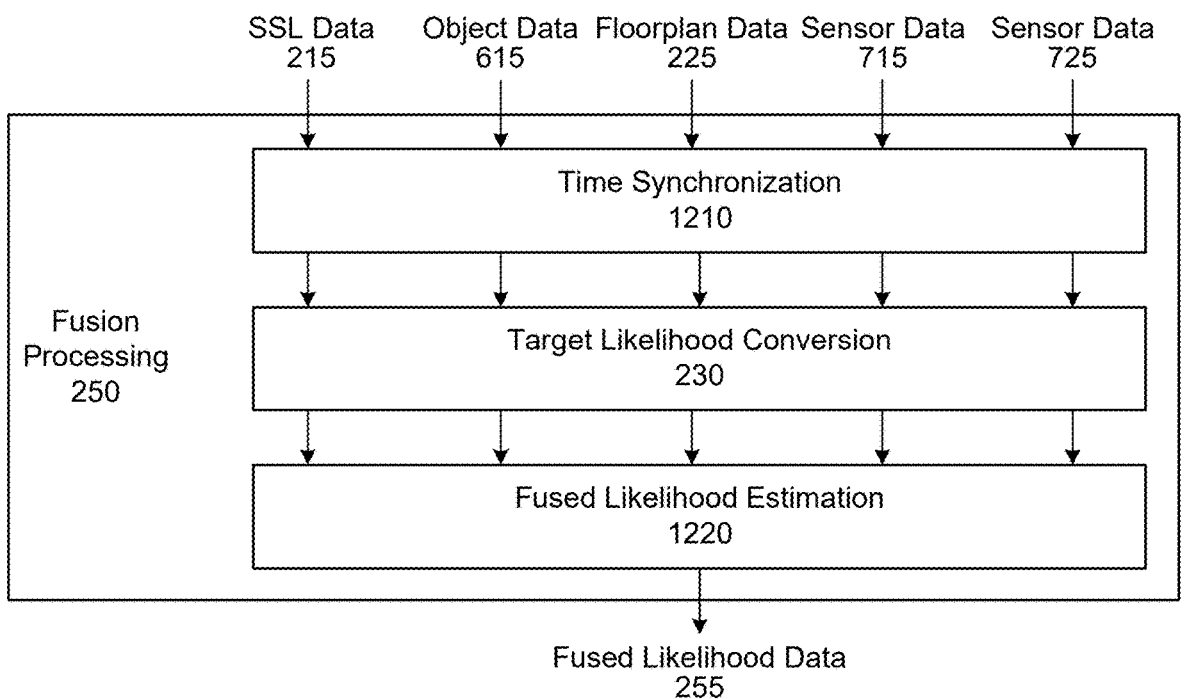

FIGS. 12A-12B are block diagram illustrating example of performing fusion processing according to embodiments of the present disclosure. As illustrated in FIG. 12A, in some examples performing fusion processing 250 may include performing time synchronization 1210 and fused likelihood estimation 1220. For example, the device 110 may perform time synchronization 1210 to synchronize timing information (e.g., timestamps) between each of the separate inputs, enabling the device 110 to synchronize these inputs using a global clock or synchronized timestamps. After performing time synchronization 1210, the device 110 may perform fused likelihood estimation 1220 to generate the fused likelihood data 255.

As illustrated in FIG. 12A and described in greater detail above, in some examples the device 110 may perform target likelihood conversion 230 to generate likelihood data 235 for each set of input data. For example, the device 110 may perform target likelihood conversion 230 to generate first likelihood data 235a associated with SSL data 215, second likelihood data 235b associated with object data 615, third likelihood data 235c associated with floorplan data 225, fourth likelihood data 235d associated with sensor data 715, fifth likelihood data 235e associated with sensor data 725, and so on for each input.

Based on this likelihood data 235, the device 110 may perform fusion processing 250 to generate the fused likelihood data 255. For example, the device 110 may perform time synchronization 1210 to select and/or combine a portion of the likelihood data 235 that is relevant to the target goal (e.g., wakeword detection, SSL processing, etc.). In some examples, the device 110 may combine a portion of the likelihood data 235 to generate a single set of likelihood data associated with an object or target goal, and/or may perform fused likelihood estimation 1220 to combine these sets of likelihood data and generate the fused likelihood data 255.

In some examples, the device 110 may perform fusion processing 250 in response to receiving event data 245, as described above and illustrated in FIGS. 2 and 6-8. In these examples, performing time synchronization 1210 may correspond to event synchronization, as the device 110 is (i) synchronizing timing information (e.g., generating synchronized timestamps) and/or the like, while also (ii) selecting a portion of the likelihood data 235 that corresponds to the event data 245. The disclosure is not limited thereto, however, and in other examples the device 110 may perform fusion processing 250 periodically, as described above and illustrated in FIG. 10. In this example, performing time synchronization 1210 may only refer to synchronizing the timing information (generating synchronized timestamps) and/or the like, although the disclosure is not limited thereto.

As illustrated in FIG. 12B, in some examples performing fusion processing 250 may include performing time synchronization 1210, target likelihood conversion 230, and fused likelihood estimation 1220. For example, the device 110 may perform time synchronization 1210 to synchronize timing information (e.g., timestamps) between each of the separate inputs, enabling the device 110 to synchronize these inputs using a global clock or synchronized timestamps. After performing time synchronization 1210, the device 110 may perform target likelihood conversion to convert the synchronized input signals to likelihood data 235. Finally, the device 110 may perform fused likelihood estimation 1220 to generate the fused likelihood data 255 from the likelihood data 235.

As shown in the example illustrated in FIG. 12B, the device 110 may perform fusion processing 250 using a variety of input signals without departing from the disclosure. For example, the device 110 may perform time synchronization 1210 and/or buffer the input signals for a variety of different inputs, including SSL data 215, object data 615, floorplan data 225, sensor data 715, sensor data 725, and so on for each input signal.

After synchronizing and/or buffering these input signals, the device 110 may perform target likelihood conversion 230 to generate likelihood data 235 for each set of input data. For example, the device 110 may perform target likelihood conversion 230 to generate first likelihood data 235*a* associated with SSL data 215, second likelihood data 235*b* associated with object data 615, third likelihood data 235*c* associated with floorplan data 225, fourth likelihood data 235*d* associated with sensor data 715, fifth likelihood data 235*e* associated with sensor data 725, and so on for each input.

While this process is similar to the steps described above with regard to FIG. 12A, in the example illustrated in FIG. 12B the device 110 only performs target likelihood conversion 230 after performing time synchronization 1210. Thus, the device 110 may perform target likelihood conversion 230 using groups of synchronized inputs and/or based on event data 245, although the disclosure is not limited thereto. Finally, the device 110 may perform fused likelihood estimation 1220 to combine these sets of likelihood data and generate the fused likelihood data 255.

If the device 110 performs fusion processing 250 in response to receiving event data 245, (as described above and illustrated in FIGS. 2 and 6-8), performing time synchronization 1210 may correspond to event synchronization. For example, the device 110 may (i) synchronize timing information (e.g., generate synchronized timestamps) and/or the like for each of the input signals and may (ii) select a portion of the input signals that correspond to the event data 245. Thus, the device 110 only performs the target likelihood conversion 230 using a subset of the input signals that are associated with the event data 245, improving an accuracy of the likelihood data 235. Additionally or alternatively, the device 110 performs the target likelihood conversion 230 using a target goal corresponding to the event data 245, which may also improve an accuracy an accuracy of the likelihood data 235. The disclosure is not limited thereto, however, and in other examples the device 110 may perform fusion processing 250 periodically, as described above and illustrated in FIG. 10. In this example, performing time synchronization 1210 may only refer to synchronizing the timing information (generating synchronized timestamps) and/or the like, although the disclosure is not limited thereto.

Figure 13A:
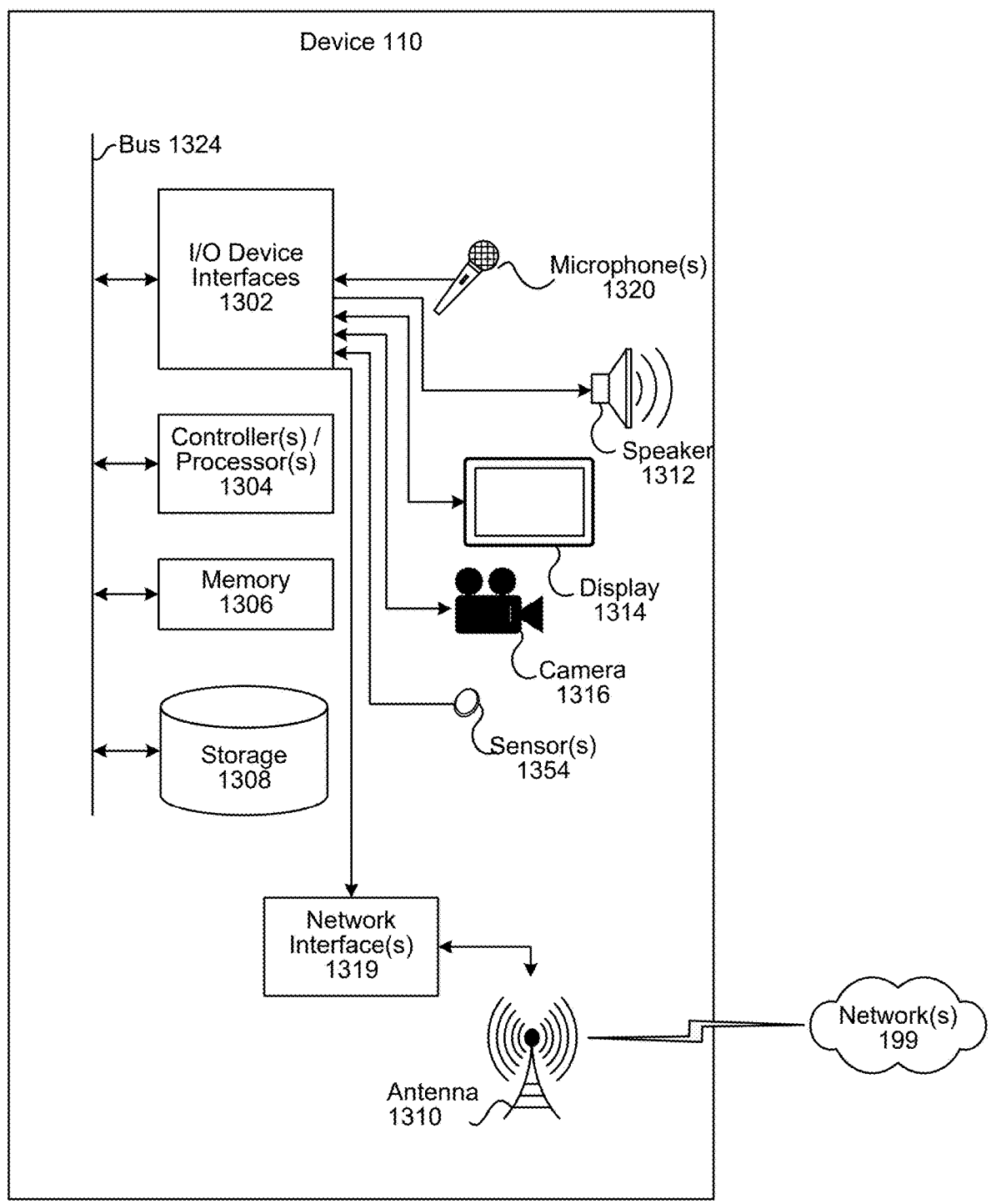
FIG. 13A is a block diagram conceptually illustrating example components of an autonomously motile device according to embodiments of the present disclosure.
Figure 14:
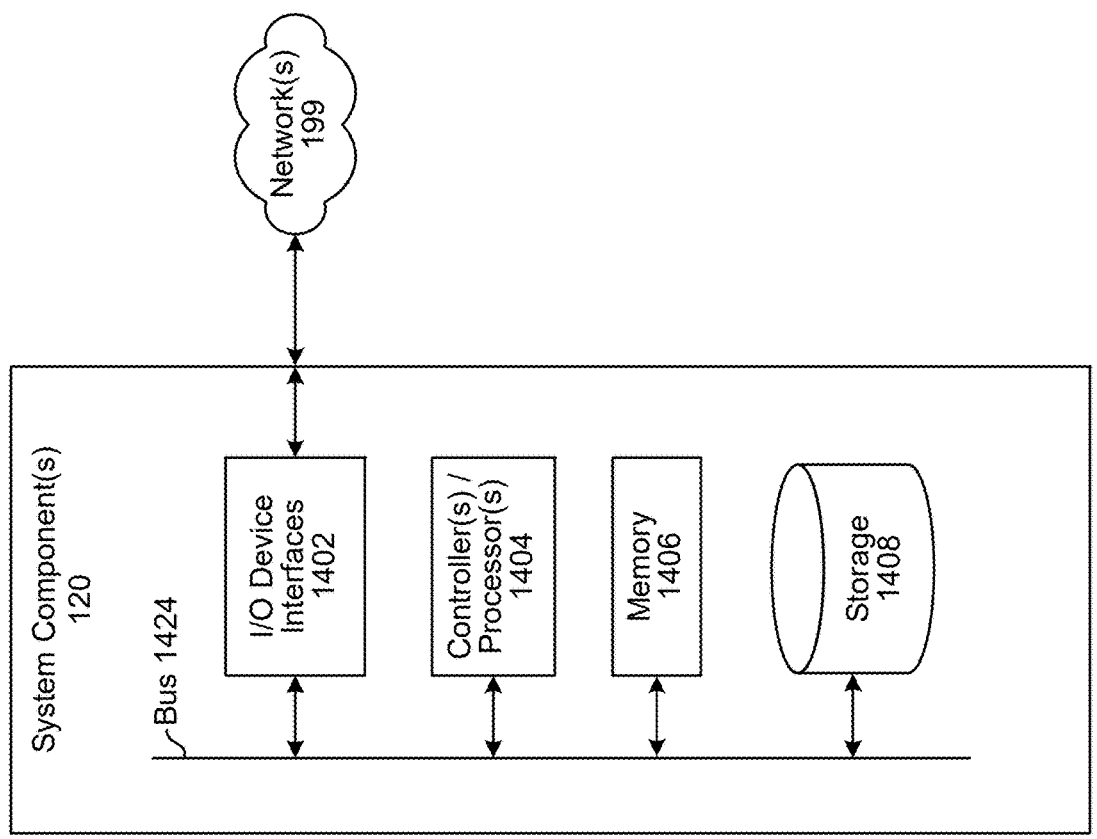
FIG. 14 is a block diagram conceptually illustrating example components of system components according to embodiments of the present disclosure.

FIG. 13A is a block diagram conceptually illustrating a device 110 that may be used with the system. FIG. 14 is a block diagram conceptually illustrating example components of system component(s) 120. The system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple system component(s) 120 may be included in the overall system 100 of the present disclosure, such as one or more system component(s) 120 for performing ASR processing, one or more system component(s) 120 for performing NLU processing, one or more system component(s) 120 for performing actions responsive to user inputs, etc. In operation, each of these systems may include computer-readable and computer-executable instructions that reside on the respective system component(s) 120, as will be discussed further below.

Each of these devices (110/120) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1302/1402).

Computer instructions for operating each device (110/120) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120) includes input/output device interfaces (1302/1402). A variety of components may be connected through the input/output device interfaces (1302/1402), as will be discussed further below. Additionally, each device (110/120) may include an address/data bus (1324/1124) for conveying data among components of the respective device. Each component within a device (110/120) may also be directly connected to other components in addition to (or instead of) being connected to other components across the bus (1324/1124).

FIG. 13A is a block diagram of some components of the device 110 such as network interfaces 1319, sensors 1354, and output devices, according to some implementations. The components illustrated here are provided by way of illustration and not necessarily as a limitation. For example, the device 110 may utilize a subset of the particular network interfaces 1319, output devices, or sensors 1354 depicted here, or may utilize components not pictured. One or more of the sensors 1354, output devices, or a combination thereof may be included on a moveable component that may be panned, tilted, rotated, or any combination thereof with respect to a chassis of the device 110.

The device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset, etc. If an array of microphones is included, approximate distance to a sound's point of origin may be determined by acoustic localization based on time and amplitude differences between sounds captured by different microphones of the array. The device 110 may additionally include a display 1314 for displaying content. The device 110 may further include a camera 1316, light, button, actuator, and/or sensor 1354.

The network interfaces 1319 may include one or more of a WLAN interface, PAN interface, secondary radio frequency (RF) link interface, and/or other interface(s). The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the device 110 and other devices in the event that communication fails using one or more of the WLAN interface or the PAN interface. For example, in the event the device 110 travels to an area within the environment that does not have Wi-Fi coverage, the device 110 may use the secondary RF link interface to communicate with another device such as a specialized access point, docking station, or other device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1302/1402) may also include and/or communicate with communication components (such as network interface(s) 1319) that allow data to be exchanged between devices such as different physical servers in a collection of servers or other components.

The components of the device(s) 110 or the system component(s) 120 may include their own dedicated processors, memory, and/or storage. Alternatively, one or more of the components of the device(s) 110 or the system component(s) 120 may utilize the I/O device interfaces (1302/1402), processor(s) (1304/1404), memory (1306/1406), and/or storage (1308/1408) of the device(s) 110 or the system component(s) 120, respectively. Thus, a first component may have its own I/O device interface(s), processor(s), memory, and/or storage; a second component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and/or the system component(s) 120, as described herein, are illustrative, and may be located as a stand-alone device or may be included, in whole or in part, as a component of a larger device or system.

Figure 13B:
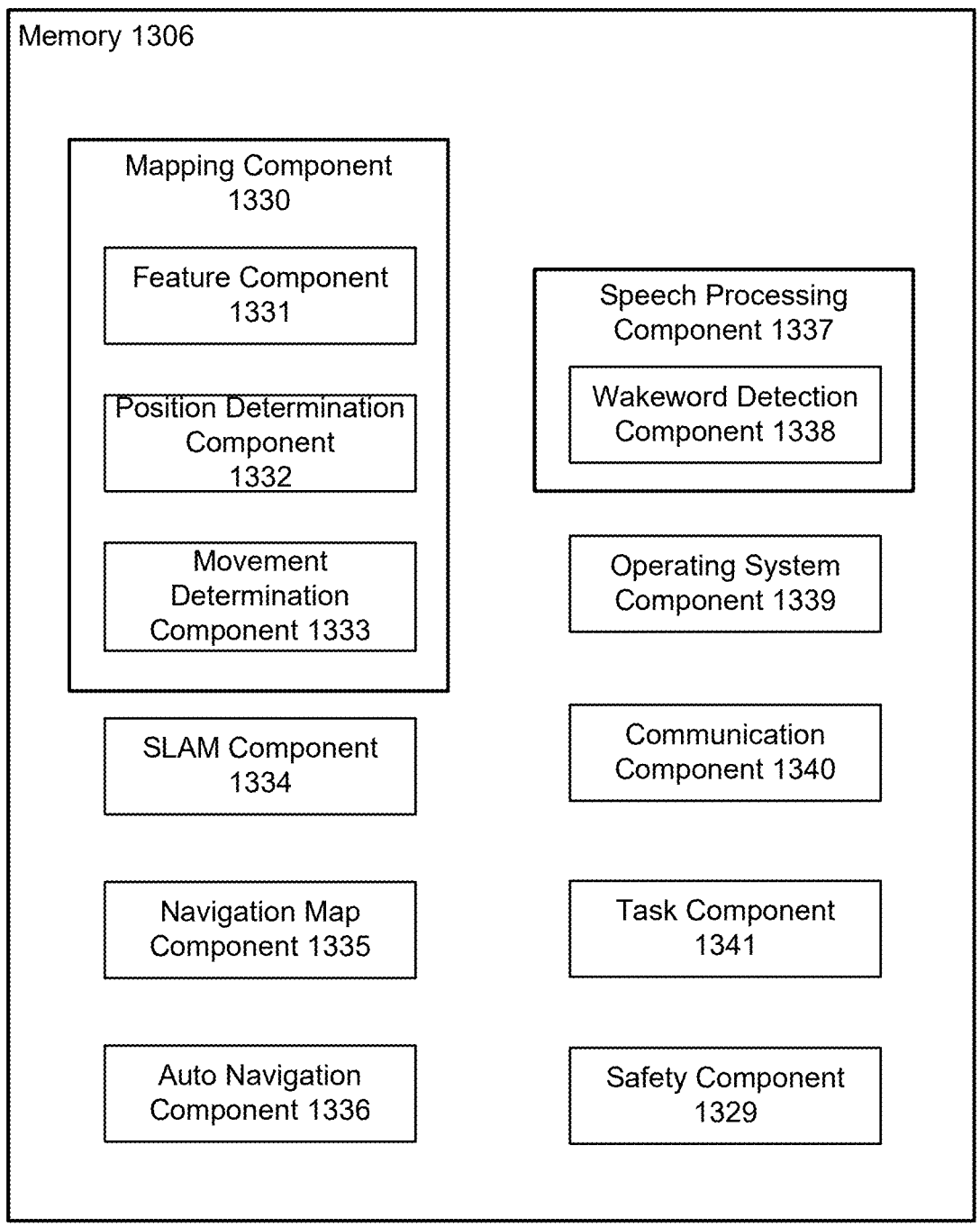
FIG. 13B illustrates components that may be stored in a memory of an autonomously motile device according to embodiments of the present disclosure.
Figure 13C:
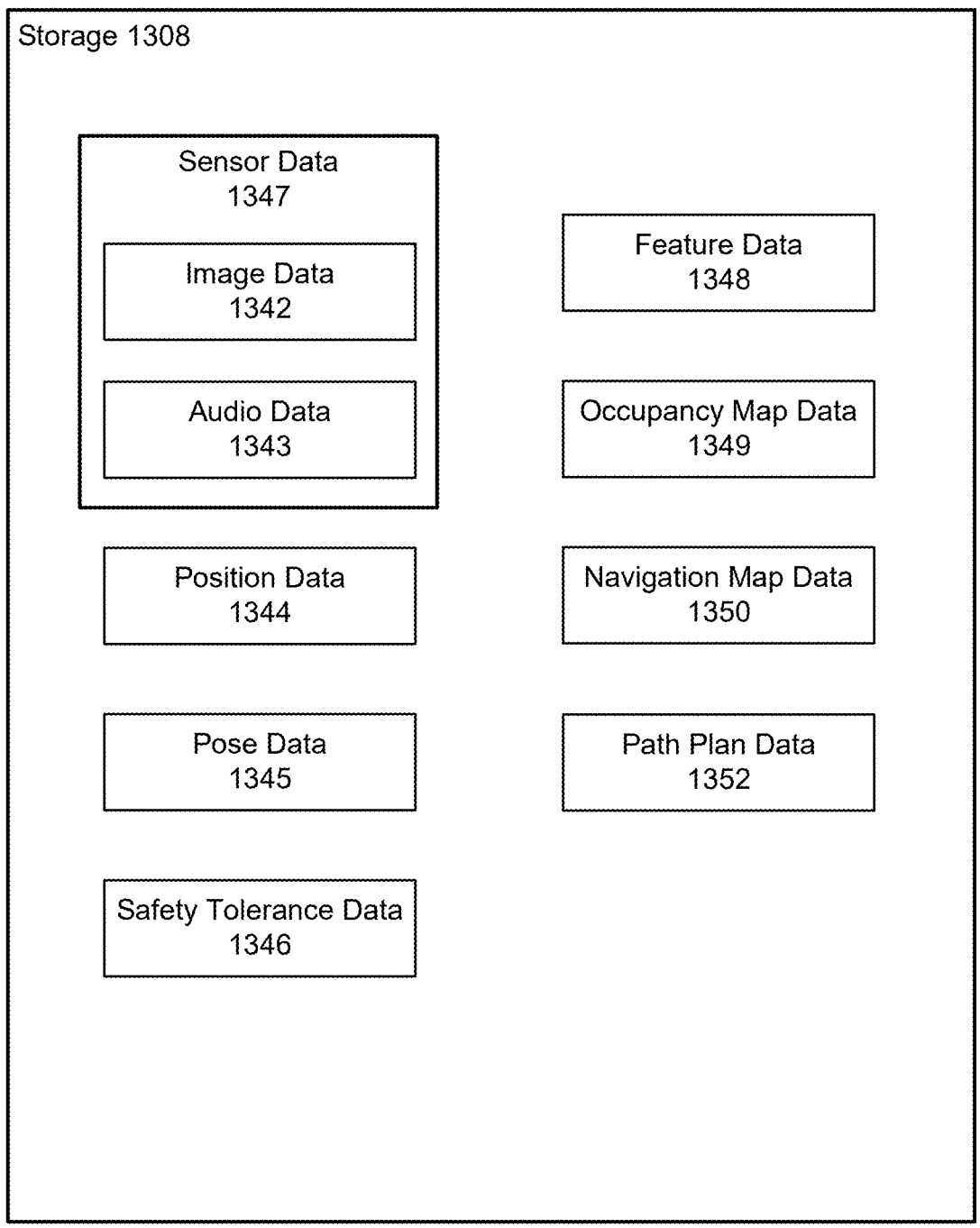
FIG. 13C illustrates data that may be stored in a storage of an autonomously motile device according to embodiments of the present disclosure.
Figure 13D:
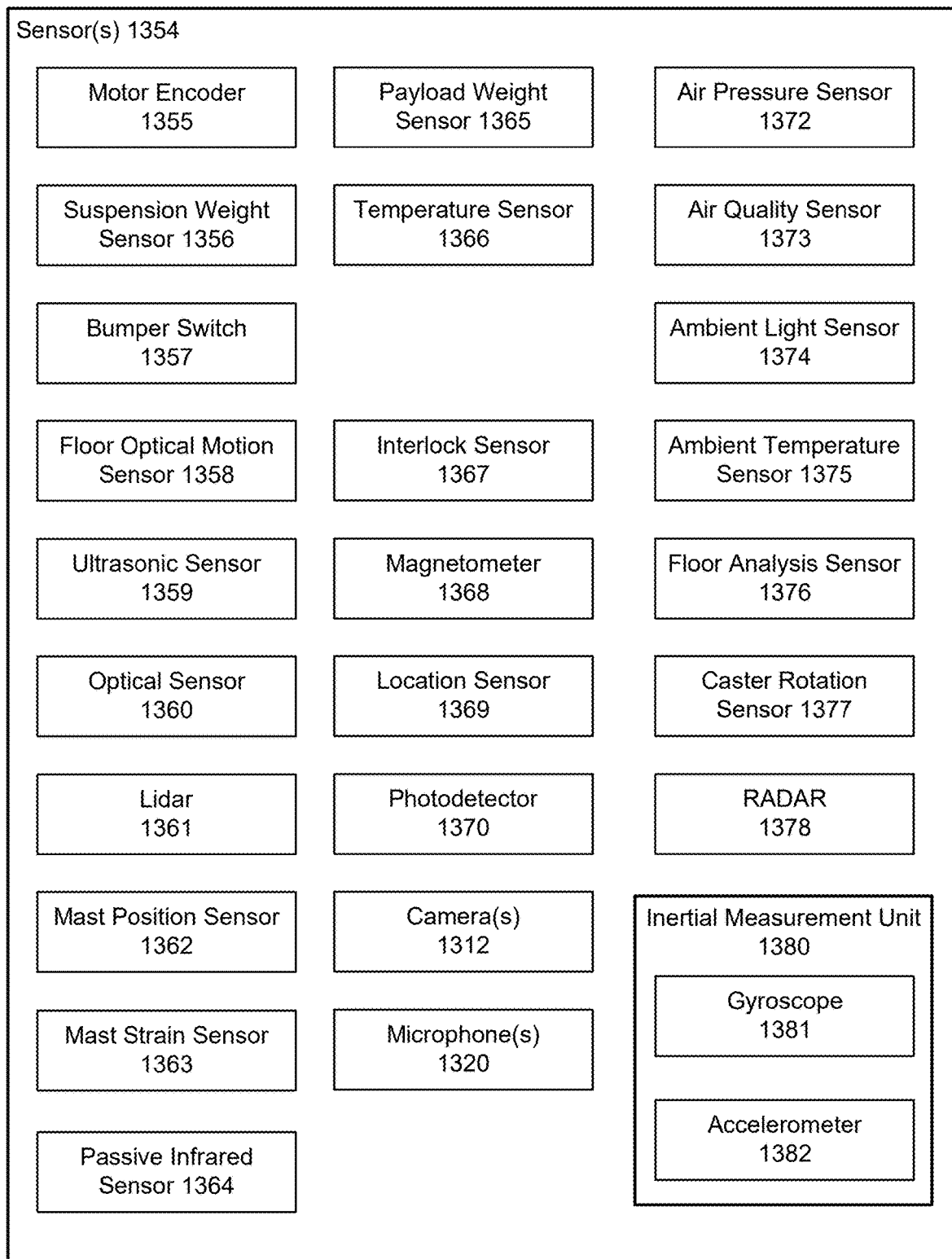
FIG. 13D illustrates sensors that may be included as part of an autonomously motile device according to embodiments of the present disclosure.

FIG. 13B illustrates components that may be stored in a memory of the device 110 according to embodiments of the present disclosure. Although illustrated as included in memory 1306, the components (or portions thereof) may also be included in hardware and/or firmware. FIG. 13C illustrates data that may be stored in a storage of the device 110 according to embodiments of the present disclosure. Although illustrated as stored in storage 1308, the data may be stored in memory 1306 or in another component. FIG. 13D illustrates sensors that may be included as part of the device 110 according to embodiments of the present disclosure.

A position determination component 1332 determines position data 1344 indicative of a position of the feature in the environment. In one implementation the position may be expressed as a set of coordinates with respect to the first camera 1316a. The position determination component 1332 may use a direct linear transformation triangulation process to determine the position of a feature in the environment based on the difference in apparent location of that feature in two images acquired by two cameras 1316 separated by a known distance.

A movement determination module 1333 determines if the feature is stationary or non-stationary. First position data 1344a indicative of a first position of a feature depicted in the first pair of images acquired at time t_1 is determined by the position determination component 1332. Second position data 1344b of the same feature indicative of a second position of the same feature as depicted in the second pair of images acquired at time t_2 is determined as well. Similar determinations made for data relative to first position and second position may also be made for third position, and so forth.

The movement determination module 1333 may use inertial data from the IMU 1380 or other sensors that provides information about how the device 110 moved between time t_1 and time t_2. The inertial data and the first position data 1344a is used to provide a predicted position of the feature at the second time. The predicted position is compared to the second position data 1344b to determine if the feature is stationary or non-stationary. If the predicted position is less than a threshold value from the second position in the second position data 1344b, then the feature is deemed to be stationary.

Features that have been deemed to be stationary may be included in the second feature data. The second feature data may thus exclude non-stationary features and comprise a subset of the first feature data 1348 which comprises stationary features.

The second feature data may be used by a simultaneous localization and mapping (SLAM) component 1334. The SLAM component 1334 may use second feature data to determine pose data 1345 that is indicative of a location of the device 110 at a given time based on the appearance of features in pairs of images. The SLAM component 1334 may also provide trajectory data indicative of the trajectory that is based on a time series of pose data 1345 from the SLAM component 1334.

Other information, such as depth data from a depth sensor, the position data 1344 associated with the features in the second feature data, and so forth, may be used to determine the presence of obstacles in the environment as represented by an occupancy map as represented by occupancy map data 1349.

The occupancy map data 1349 may comprise data that indicates the location of one or more obstacles, such as a table, wall, stairwell, and so forth. In some implementations, the occupancy map data 1349 may comprise a plurality of cells with each cell of the plurality of cells representing a particular area in the environment. Data, such as occupancy values, may be stored that indicates whether an area of the environment associated with the cell is unobserved, occupied by an obstacle, or is unoccupied. An obstacle may comprise an object or feature that prevents or impairs traversal by the device 110. For example, an obstacle may comprise a wall, stairwell, and so forth.

The occupancy map data 1349 may be manually or automatically determined. For example, during a learning phase the user may take the device 110 on a tour of the environment, allowing the mapping component 1330 of the device 110 to determine the occupancy map data 1349. The user may provide input data such as tags designating a particular obstacle type, such as "furniture" or "fragile". In another example, during subsequent operation, the device 110 may generate the occupancy map data 1349 that is indicative of locations and types of obstacles such as chairs, doors, stairwells, and so forth as it moves unattended through the environment.

Modules described herein, such as the mapping component 1330, may provide various processing functions such as de-noising, filtering, and so forth. Processing of sensor data 1347, such as image data from a camera 1316, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1347. In still another implementation, functions such as those in the Machine Vision Toolbox (MVTB) available using MAT-LAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1347 or other data. For example, the ANN may be trained using a supervised learning algorithm such that object identifiers are associated with images of particular objects within training images provided to the ANN. Once trained, the ANN may be provided with the sensor data 1347 and produce output indicative of the object identifier.

A navigation map component 1335 uses the occupancy map data 1349 as input to generate a navigation map as represented by navigation map data 1350. For example, the navigation map component 1335 may produce the navigation map data 1350 by inflating or enlarging the apparent size of obstacles as indicated by the occupancy map data 1349.

An autonomous navigation component 1336 provides the device 110 with the ability to navigate within the environment without real-time human interaction. The autonomous navigation component 1336 may implement, or operate in conjunction with, the mapping component 1330 to determine one or more of the occupancy map data 1349, the navigation map data 1350, or other representations of the environment.

The device 110 autonomous navigation component 1336 may generate path plan data 1352 that is indicative of a path through the environment from the current location to a destination location. The device 110 may then begin moving along the path.

While moving along the path, the device 110 may assess the environment and update or change the path as appropriate. For example, if an obstacle appears in the path, the mapping component 1330 may determine the presence of the obstacle as represented in the occupancy map data 1349 and navigation map data 1350. The now updated navigation map data 1350 may then be used to plan an alternative path to the destination location.

The device 110 may utilize one or more task components 1341. The task component 1341 comprises instructions that, when executed, provide one or more functions. The task components 1341 may perform functions such as finding a user, following a user, present output on output devices of the device 110, perform sentry tasks by moving the device 110 through the environment to determine the presence of unauthorized people, and so forth.

The device 110 includes one or more output devices, such as one or more of a motor, light, speaker, display, projector, printer, and so forth. One or more output devices may be used to provide output during operation of the device 110.

The device 110 may use the network interfaces 1319 to connect to network(s) 199. For example, the network(s) 199 may comprise a wireless local area network, that in turn is connected to a wide area network such as the Internet.

The device 110 may be configured to dock or connect to a docking station. The docking station may also be connected to the network(s) 199. For example, the docking station may be configured to connect to the network(s) 199 (e.g., wireless local area network) such that the docking station and the device 110 may communicate. The docking station may provide external power which the device 110 may use to charge a battery of the device 110.

The device 110 may access one or more servers of the system component(s) 120 via the network(s) 199. For example, the device 110 may utilize a wakeword detection component to determine if the user is addressing a request to the device 110. The wakeword detection component may hear a specified word or phrase and transition the device 110 or portion thereof to the wake operating mode. Once in the wake operating mode, the device 110 may then transfer at least a portion of the audio spoken by the user to one or more servers for further processing. The servers may process the spoken audio and return to the device 110 data that may be subsequently used to operate the device 110.

The device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomously motile devices may use the systems and techniques described herein. For example, the device 110 may comprise an autonomous ground vehicle that is moving on a street, an autonomous aerial vehicle in the air, autonomous marine vehicle, and so forth.

The device 110 may include one or more batteries (not shown) to provide electrical power suitable for operating the components in the device 110. In some implementations other devices may be used to provide electrical power to the device 110. For example, power may be provided by wireless power transfer, capacitors, fuel cells, storage flywheels, and so forth.

One or more clocks may provide information indicative of date, time, ticks, and so forth. For example, the processor 1304 may use data from the clock to associate a particular time with an action, sensor data 1347, and so forth.

The device 110 may include one or more hardware processors 1304 (processors) configured to execute one or more stored instructions. The processors 1304 may comprise one or more cores. The processors 1304 may include microcontrollers, systems on a chip, field programmable gate arrays, digital signal processors, graphic processing units, general processing units, and so forth.

The device 110 may include one or more communication component 1340 such as input/output (I/O) interfaces 1302, network interfaces 1319, and so forth. The communication component 1340 enable the device 110, or components thereof, to communicate with other devices or components. The communication component 1340 may include one or more I/O interfaces 1302. The I/O interfaces 1302 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1302 may couple to one or more I/O devices. The I/O devices may include input devices such as one or more of a sensor 1354, keyboard, mouse, scanner, and so forth. The I/O devices may also include output devices such as one or more of a motor, light, speaker 1312, display 1314, projector, printer, and so forth. In some embodiments, the I/O devices may be physically incorporated with the device 110 or may be externally placed.

The I/O interface(s) 1302 may be configured to provide communications between the device 110 and other devices such as other devices 110, docking stations, routers, access points, and so forth, for example through antenna 1310 and/or other component. The I/O interface(s) 1302 may include devices configured to couple to personal area networks (PANs), local area networks (LANs), wireless local area networks (WLANS), wide area networks (WANs), and so forth. For example, the network interfaces 1319 may include devices compatible with Ethernet, Wi-Fi, Bluetooth, Bluetooth Low Energy, ZigBee, and so forth. The device 110 may also include one or more busses 1324 or other internal communications hardware or software that allow for the transfer of data between the various modules and components of the device 110.

As shown in FIG. 13A, the device 110 includes one or more memories 1306. The memory 1306 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1306 provides storage of computer-readable instructions, data structures, program modules, and other data for the operation of the device 110. A few example functional modules are shown stored in the memory 1306, although the same functionality may alternatively be implemented in hardware, firmware, or as a system on a chip (SoC).

The memory 1306 may include at least one operating system (OS) component 1339. The OS component 1339 is configured to manage hardware resource devices such as the I/O interfaces 1302, the I/O devices, the communication component 1340, and provide various services to applications or modules executing on the processors 1304. The OS component 1339 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Washington.

Also stored in the memory 1306, or elsewhere may be a data store 1308 and one or more of the following modules. These modules may be executed as foreground applications, background tasks, daemons, and so forth. The data store 1308 may use a flat file, database, linked list, tree, executable code, script, or other data structure to store information. In some implementations, the data store 1308 or a portion of the data store 1308 may be distributed across one or more other devices including other devices 110, system component(s) 120, network attached storage devices, and so forth.

A communication component 1340 may be configured to establish communication with other devices, such as other devices 110, an external server of the system component(s)

120, a docking station, and so forth. The communications may be authenticated, encrypted, and so forth.

Other modules within the memory 1306 may include a safety component 1329, the mapping component 1330, the navigation map component 1335, the autonomous navigation component 1336, the one or more components 1341, a speech processing component 1337, or other components. The components may access data stored within the data store 1308, including safety tolerance data 1346, sensor data 1347, inflation parameters, other data, and so forth.

The safety component 1329 may access the safety tolerance data 1346 to determine within what tolerances the device 110 may operate safely within the environment. For example, the safety component 1329 may be configured to stop the device 110 from moving when an extensible mast of the device 110 is extended. In another example, the safety tolerance data 1346 may specify a minimum sound threshold which, when exceeded, stops all movement of the device 110.

Continuing this example, detection of sound such as a human yell would stop the device 110. In another example, the safety component 1329 may access safety tolerance data 1346 that specifies a minimum distance from an object that the device 110 is to maintain. Continuing this example, when a sensor 1354 detects an object has approached to less than the minimum distance, all movement of the device 110 may be stopped. Movement of the device 110 may be stopped by one or more of inhibiting operations of one or more of the motors, issuing a command to stop motor operation, disconnecting power from one or more the motors, and so forth. The safety component 1329 may be implemented as hardware, software, or a combination thereof.

The safety component 1329 may control other factors, such as a maximum speed of the device 110 based on information obtained by the sensors 1354, precision and accuracy of the sensor data 1347, and so forth. For example, detection of an object by an optical sensor may include some error, such as when the distance to an object comprises a weighted average between an object and a background. As a result, the maximum speed permitted by the safety component 1329 may be based on one or more factors such as the weight of the device 110, nature of the floor, distance to the object, and so forth. In the event that the maximum permissible speed differs from the maximum speed permitted by the safety component 1329, the lesser speed may be utilized.

The navigation map component 1335 uses the occupancy map data 1349 as input to generate the navigation map data 1350. The navigation map component 1335 may produce the navigation map data 1350 to inflate or enlarge the obstacles indicated by the occupancy map data 1349. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the device 110, and so forth.

The speech processing component 1337 may be used to process utterances of the user. Microphones may acquire audio in the presence of the device 110 and may send raw audio data 1343 to an acoustic front end (AFE). The AFE may transform the raw audio data 1343 (for example, a single-channel, 16-bit audio stream sampled at 16 kHz), captured by the microphone, into audio feature vectors that may ultimately be used for processing by various components, such as a wakeword detection module 1338, speech recognition engine, or other components. The AFE may reduce noise in the raw audio data 1343. The AFE may also perform acoustic echo cancellation (AEC) or other operations to account for output audio data that may be sent to a speaker of the device 110 for output. For example, the device 110 may be playing music or other audio that is being received from network(s) 199 in the form of output audio data. To prevent the output audio interfering with the device's ability to detect and process input audio, the AFE or other component may perform echo cancellation to remove the output audio data from the input raw audio data 1343, or other operations.

The AFE may divide the raw audio data 1343 into frames representing time intervals for which the AFE determines a number of values (i.e., features) representing qualities of the raw audio data 1343, along with a set of those values (i.e., a feature vector or audio feature vector) representing features/qualities of the raw audio data 1343 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1343, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1343) may be input into a wakeword detection module 1338 that is configured to detect keywords spoken in the audio. The wakeword detection module 1338 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 1338 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1338 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local device 110 may "wake" and begin transmitting audio data (which may include one or more of the raw audio data 1343 or the audio feature vectors) to one or more system component(s) 120 for speech processing. The audio data corresponding to audio obtained by the microphone may be processed locally on one or more of the processors 1304, sent to a server for routing to a recipient device or may be sent to the system component(s) 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the device 110 before processing by the navigation map component 1335, prior to sending to the server and/or the system component(s) 120, and so forth.

The speech processing component 1337 may include or access an ASR module. The ASR module may accept as input raw audio data 1343, audio feature vectors, or other sensor data 1347 and so forth and may produce as output the input data comprising a text string or other data representation. The input data comprising the text string or other data representation may be processed by the navigation map component 1335 to determine the command to be executed. For example, the utterance of the command "robot, come here" may result in input data comprising the text string "come here". The wakeword "robot" may be omitted from the input data.

The autonomous navigation component 1336 provides the device 110 with the ability to navigate within the environment without real-time human interaction. The autonomous navigation component 1336 may implement, or operate in conjunction with, the mapping component 1330 to determine the occupancy map data 1349, the navigation map data 1350, or other representation of the environment. In one implementation, the mapping component 1330 may use one or more simultaneous localization and mapping ("SLAM") techniques. The SLAM algorithms may utilize one or more of maps, algorithms, beacons, or other techniques to navigate. The autonomous navigation component 1336 may use the navigation map data 1350 to determine a set of possible paths along which the device 110 may move. One of these may be selected and used to determine path plan data 1352 indicative of a path. For example, a possible path that is the shortest or has the fewest turns may be selected and used to determine the path. The path is then subsequently used to determine a set of commands that drive the motors connected to the wheels. For example, the autonomous navigation component 1336 may determine the current location within the environment and determine path plan data 1352 that describes the path to a destination location such as the docking station.

The autonomous navigation component 1336 may utilize various techniques during processing of sensor data 1347. For example, image data 1342 obtained from cameras 1316 on the device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The device 110 may move responsive to a determination made by an onboard processor 1304, in response to a command received from one or more network interfaces 1319, as determined from the sensor data 1347, and so forth. For example, the system component(s) 120 may send a command that is received using the network interface 1319. This command may direct the device 110 to proceed to find a particular user, follow a particular user, and so forth. The device 110 may then process this command and use the autonomous navigation component 1336 to determine the directions and distances associated with carrying out the command. For example, the command to "come here" may result in a task component 1341 sending a command to the autonomous navigation component 1336 to move the device 110 to a particular location near the user and orient the device 110 in a particular direction.

The device 110 may connect to the network(s) 199 using one or more of the network interfaces 1319. In some implementations, one or more of the modules or other functions described here may execute on the processors 1304 of the device 110, on the system component(s) 120, or a combination thereof. For example, the system component(s) 120 may provide various functions, such as ASR, natural language understanding (NLU), providing content such as audio or video to the device 110, and so forth.

The other components may provide other functionality, such as object recognition, speech synthesis, user identification, and so forth. The other components may comprise a speech synthesis module that is able to convert text data to human speech. For example, the speech synthesis module may be used by the device 110 to provide speech that a user is able to understand.

The data store 1308 may store the other data as well. For example, localization settings may indicate local preferences such as language, user identifier data may be stored that allows for identification of a particular user, and so forth.

As shown in FIG. 13D, the device 110 may include one or more of the following sensors 1354. The sensors 1354 depicted here are provided by way of illustration and not necessarily as a limitation. It is understood that other sensors

1354 may be included or utilized by the device 110, while some sensors 1354 may be omitted in some configurations.

A motor encoder 1355 provides information indicative of the rotation or linear extension of a motor. The motor may comprise a rotary motor, or a linear actuator. In some implementations, the motor encoder 1355 may comprise a separate assembly such as a photodiode and encoder wheel that is affixed to the motor. In other implementations, the motor encoder 1355 may comprise circuitry configured to drive the motor. For example, the autonomous navigation component 1336 may utilize the data from the motor encoder 1355 to estimate a distance traveled.

A suspension weight sensor 1356 provides information indicative of the weight of the device 110 on the suspension system for one or more of the wheels or the caster. For example, the suspension weight sensor 1356 may comprise a switch, strain gauge, load cell, photodetector, or other sensing element that is used to determine whether weight is applied to a particular wheel, or whether weight has been removed from the wheel. In some implementations, the suspension weight sensor 1356 may provide binary data such as a "1" value indicating that there is a weight applied to the wheel, while a "0" value indicates that there is no weight applied to the wheel. In other implementations, the suspension weight sensor 1356 may provide an indication such as so many kilograms of force or newtons of force. The suspension weight sensor 1356 may be affixed to one or more of the wheels or the caster. In some situations, the safety component 1329 may use data from the suspension weight sensor 1356 to determine whether or not to inhibit operation of one or more of the motors. For example, if the suspension weight sensor 1356 indicates no weight on the suspension, the implication is that the device 110 is no longer resting on its wheels, and thus operation of the motors may be inhibited. In another example, if the suspension weight sensor 1356 indicates weight that exceeds a threshold value, the implication is that something heavy is resting on the device 110 and thus operation of the motors may be inhibited.

One or more bumper switches 1357 provide an indication of physical contact between a bumper or other member that is in mechanical contact with the bumper switch 1357. The safety component 1329 utilizes sensor data 1347 obtained by the bumper switches 1357 to modify the operation of the device 110. For example, if the bumper switch 1357 associated with a front of the device 110 is triggered, the safety component 1329 may drive the device 110 backwards.

A floor optical motion sensor 1358 provides information indicative of motion of the device 110 relative to the floor or other surface underneath the device 110. In one implementation, the floor optical-motion sensors 1358 may comprise a light source such as light-emitting diode (LED), an array of photodiodes, and so forth. In some implementations, the floor optical-motion sensors 1358 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1358 may provide other information, such as data indicative of a pattern present on the floor, composition of the floor, color of the floor, and so forth. For example, the floor optical-motion sensors 1358 may utilize an optoelectronic sensor that may detect different colors or shades of gray, and this data may be used to generate floor characterization data. The floor characterization data may be used for navigation.

An ultrasonic sensor 1359 utilizes sounds in excess of 20 kHz to determine a distance from the sensor 1354 to an object. The ultrasonic sensor 1359 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1359 may provide information indicative of a presence of an object, distance to the object, and so forth. Two or more ultrasonic sensors 1359 may be utilized in conjunction with one another to determine a location within a two-dimensional plane of the object.

In some implementations, the ultrasonic sensor 1359 or a portion thereof may be used to provide other functionality. For example, the emitter of the ultrasonic sensor 1359 may be used to transmit data and the detector may be used to receive data transmitted that is ultrasonic sound. In another example, the emitter of an ultrasonic sensor 1359 may be set to a particular frequency and used to generate a particular waveform such as a sawtooth pattern to provide a signal that is audible to an animal, such as a dog or a cat.

An optical sensor 1360 may provide sensor data 1347 indicative of one or more of a presence or absence of an object, a distance to the object, or characteristics of the object. The optical sensor 1360 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1360 may utilize one or more sensing elements. For example, the optical sensor 1360 may comprise a 4×4 array of light sensing elements. Each individual sensing element may be associated with a field of view that is directed in a different way. For example, the optical sensor 1360 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 1354 such as an image sensor or camera 1316. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1360 may operate as a depth camera, providing a two-dimensional image of a scene, as well as data that indicates a distance to each pixel.

Data from the optical sensors 1360 may be utilized for collision avoidance. For example, the safety component 1329 and the autonomous navigation component 1336 may utilize the sensor data 1347 indicative of the distance to an object in order to prevent a collision with that object.

Multiple optical sensors 1360 may be operated such that their field-of-view overlap at least partially. To minimize or eliminate interference, the optical sensors 1360 may selectively control one or more of the timing, modulation, or frequency of the light emitted. For example, a first optical sensor 1360 may emit light modulated at 30 kHz while a second optical sensor 1360 emits light modulated at 33 kHz.

A lidar 1361 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1347 may be generated that is indicative of the presence of objects and the relative positions, shapes, and so forth that are visible to the lidar 1361. Data from the lidar 1361 may be used by various modules. For example, the autonomous navigation component 1336 may utilize point cloud data generated by the lidar 1361 for localization of the device 110 within the environment.

The device 110 may include a mast. A mast position sensor 1362 provides information indicative of a position of the mast of the device 110. For example, the mast position sensor 1362 may comprise limit switches associated with the mast extension mechanism that indicate whether the mast is at an extended or retracted position. In other implementations, the mast position sensor 1362 may comprise an optical code on at least a portion of the mast that is then interrogated by an optical emitter and a photodetector to determine the distance to which the mast is extended. In another implementation, the mast position sensor 1362 may comprise an encoder wheel that is attached to a mast motor that is used to raise or lower the mast. The mast position sensor 1362 may provide data to the safety component 1329. For example, if the device 110 is preparing to move, data from the mast position sensor 1362 may be checked to determine if the mast is retracted, and if not, the mast may be retracted prior to beginning movement.

A mast strain sensor 1363 provides information indicative of a strain on the mast with respect to the remainder of the device 110. For example, the mast strain sensor 1363 may comprise a strain gauge or load cell that measures a side-load applied to the mast or a weight on the mast or downward pressure on the mast. The safety component 1329 may utilize sensor data 1347 obtained by the mast strain sensor 1363. For example, if the strain applied to the mast exceeds a threshold amount, the safety component 1329 may direct an audible and visible alarm to be presented by the device 110.

The device 110 may include a modular payload bay. A payload weight sensor 1365 provides information indicative of the weight associated with the modular payload bay. The payload weight sensor 1365 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1365 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1365 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1329 may utilize the payload weight sensor 1365 to determine if the modular payload bay has been overloaded. If so, an alert or notification may be issued.

One or more device temperature sensors 1366 may be utilized by the device 110. The device temperature sensors 1366 provide temperature data of one or more components within the device 110. For example, a device temperature sensor 1366 may indicate a temperature of one or more batteries, one or more motors, and so forth. In the event the temperature exceeds a threshold value, the component associated with that device temperature sensor 1366 may be shut down.

One or more interlock sensors 1367 may provide data to the safety component 1329 or other circuitry that prevents the device 110 from operating in an unsafe condition. For example, the interlock sensors 1367 may comprise switches that indicate whether an access panel is open. The interlock sensors 1367 may be configured to inhibit operation of the device 110 until the interlock switch indicates a safe condition is present.

An inertial measurement unit (IMU) 1380 may include a plurality of gyroscopes 1381 and accelerometers 1382 arranged along different axes. The gyroscope 1381 may provide information indicative of rotation of an object affixed thereto. For example, a gyroscope 1381 may generate sensor data 1347 that is indicative of a change in orientation of the device 110 or a portion thereof.

The accelerometer 1382 provides information indicative of a direction and magnitude of an imposed acceleration. Data such as rate of change, determination of changes in direction, speed, and so forth may be determined using the accelerometer 1382. The accelerometer 1382 may comprise mechanical, optical, micro-electromechanical, or other devices. For example, the gyroscope 1381 in the accelerometer 1382 may comprise a prepackaged solid-state unit.

A magnetometer 1368 may be used to determine an orientation by measuring ambient magnetic fields, such as the terrestrial magnetic field. For example, the magnetometer 1368 may comprise a Hall effect transistor that provides output compass data indicative of a magnetic heading.

The device 110 may include one or more location sensors 1369. The location sensors 1369 may comprise an optical, radio, or other navigational system such as a global positioning system (GPS) receiver. For indoor operation, the location sensors 1369 may comprise indoor position systems, such as using Wi-Fi Positioning Systems (WPS). The location sensors 1369 may provide information indicative of a relative location, such as "living room" or an absolute location such as particular coordinates indicative of latitude and longitude, or displacement with respect to a predefined origin.

A photodetector 1370 provides sensor data 1347 indicative of impinging light. For example, the photodetector 1370 may provide data indicative of a color, intensity, duration, and so forth.

A camera 1316 generates sensor data 1347 indicative of one or more images. The camera 1316 may be configured to detect light in one or more wavelengths including, but not limited to, terahertz, infrared, visible, ultraviolet, and so forth. For example, an infrared camera 1316 may be sensitive to wavelengths between approximately 700 nanometers and 1 millimeter. The camera 1316 may comprise charge coupled devices (CCD), complementary metal oxide semiconductor (CMOS) devices, microbolometers, and so forth. The device 110 may use image data acquired by the camera 1316 for object recognition, navigation, collision avoidance, user communication, and so forth. For example, a pair of cameras 1316 sensitive to infrared light may be mounted on the front of the device 110 to provide binocular stereo vision, with the sensor data 1347 comprising images being sent to the autonomous navigation component 1336. In another example, the camera 1316 may comprise a 10 megapixel or greater camera that is used for videoconferencing or for acquiring pictures for the user.

The camera 1316 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 1316, particularly those associated with navigation or autonomous operation, may utilize a global shutter. In other implementations, the camera(s) 1316 providing images for use by the autonomous navigation component 1336 may be acquired using a rolling shutter and subsequently may be processed to mitigate image artifacts.

One or more microphones 1320 may be configured to acquire information indicative of sound present in the environment. In some implementations, arrays of microphones 1320 may be used. These arrays may implement beamforming techniques to provide for directionality of gain. The device 110 may use the one or more microphones 1320 to acquire information from acoustic tags, accept voice input from users, determine a direction of an utterance, determine ambient noise levels, for voice communication with another user or system, and so forth.

An air pressure sensor 1372 may provide information indicative of an ambient atmospheric pressure or changes in ambient atmospheric pressure. For example, the air pressure sensor 1372 may provide information indicative of changes in air pressure due to opening and closing of doors, weather events, and so forth.

An air quality sensor 1373 may provide information indicative of one or more attributes of the ambient atmosphere. For example, the air quality sensor 1373 may include one or more chemical sensing elements to detect the presence of carbon monoxide, carbon dioxide, ozone, and so forth. In another example, the air quality sensor 1373 may comprise one or more elements to detect particulate matter in the air, such as the photoelectric detector, ionization chamber, and so forth. In another example, the air quality sensor 1373 may include a hygrometer that provides information indicative of relative humidity.

An ambient light sensor 1374 may comprise one or more photodetectors or other light-sensitive elements that are used to determine one or more of the color, intensity, or duration of ambient lighting around the device 110.

An ambient temperature sensor 1375 provides information indicative of the temperature of the ambient environment proximate to the device 110. In some implementations, an infrared temperature sensor may be utilized to determine the temperature of another object at a distance.

A floor analysis sensor 1376 may include one or more components that are used to generate at least a portion of floor characterization data. In one implementation, the floor analysis sensor 1376 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1376 may be used by one or more of the safety component 1329, the autonomous navigation component 1336, the task component 1341, and so forth. For example, if the floor analysis sensor 1376 determines that the floor is wet, the safety component 1329 may decrease the speed of the device 110 and generate a notification alerting the user.

The floor analysis sensor 1376 may include other components as well. For example, a coefficient of friction sensor may comprise a probe that comes into contact with the surface and determines the coefficient of friction between the probe and the floor.

A caster rotation sensor 1377 provides data indicative of one or more of a direction of orientation, angular velocity, linear speed of the caster, and so forth. For example, the caster rotation sensor 1377 may comprise an optical encoder and corresponding target that is able to determine that the caster transitioned from an angle of 0° at a first time to 490 at a second time.

The sensors 1354 may include a radar 1378. The radar 1378 may be used to provide information as to a distance, lateral position, and so forth, to an object.

The sensors 1354 may include a passive infrared (PIR) sensor 1364. The PIR 1364 sensor may be used to detect the presence of users, pets, hotspots, and so forth. For example, the PIR sensor 1364 may be configured to detect infrared radiation with wavelengths between 8 and 14 micrometers.

The device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment to provide landmarks for the autonomous navigation component 1336. One or more touch sensors may be utilized to determine contact with a user or other objects.

The device 110 may include one or more output devices. A motor (not shown) may be used to provide linear or rotary motion. A light 358 may be used to emit photons. A speaker 1312 may be used to emit sound. A display 1314 may comprise one or more of a liquid crystal display, light emitting diode display, electrophoretic display, cholesteric liquid crystal display, interferometric display, and so forth. The display 1314 may be used to present visible information such as graphics, pictures, text, and so forth. In some implementations, the display 1314 may comprise a touchscreen that combines a touch sensor and a display 1314.

In some implementations, the device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the device 110 may include a haptic output device that provides output that produces particular touch sensations to the user. Continuing the example, a motor with an eccentric weight may be used to create a buzz or vibration to allow the device 110 to simulate the purr of a cat.

As noted above, multiple devices may be employed in a single system. In such a multi-device system, each of the devices may include different components for performing different aspects of the system's processing. The multiple devices may include overlapping components. The components of the device 110 and/or the system component(s) 120, as described herein, are illustrative, and may be located as a stand-alone device or may be included, in whole or in part, as a component of a larger device or system.

As illustrated in FIG. 15, multiple devices (110a-110d, 120) may contain components of the system and the devices may be connected over a network(s) 199. The network(s) 199 may include a local or private network or may include a wide network such as the Internet. Devices may be connected to the network(s) 199 through either wired or wireless connections. For example, a smart phone 110a, a tablet computer 110b, a speech-detection device with display 110c, a motile device 110d, and/or the like may be connected to the network(s) 199 through a wireless service provider, over a WiFi or cellular network connection, or the like. Other devices are included as network-connected support devices, such as system component(s) 120 and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving first audio data corresponding to audio captured by at least one microphone of a device;
    determining first data using the first audio data, wherein the first data associates a first sound with a first direction relative to the device and associates a second sound with a second direction relative to the device;
    receiving second data corresponding to at least a first location associated with a first object;
    determining that an acoustic event is represented in the first audio data;
    determining first target likelihood data using the second data, wherein the first target likelihood data associates a first likelihood value with at least one direction corresponding to the first location;
    determining second target likelihood data using the first data and the first target likelihood data, wherein the second target likelihood data associates a second likelihood value with the first direction and a third likelihood value with the second direction; and
    associating the acoustic event with the first direction based on the second target likelihood data.

2. The computer-implemented method of claim 1, wherein associating the acoustic event with the first direction further comprises:
    determining that the second likelihood value satisfies a condition;
    determining that the second likelihood value corresponds to the first direction; and
    associating the acoustic event with the first direction.

3. The computer-implemented method of claim 1, wherein the device is an autonomously motile device capable of independent movement.

4. The computer-implemented method of claim 1, wherein determining the first data further comprises:
   determining, using the first audio data, a first energy value associated with the first direction and a second energy value associated with the second direction;
   determining, using the first energy value, a fourth likelihood value, wherein the fourth likelihood value is associated with the first direction in the first data; and
   determining, using the second energy value, a fifth likelihood value, wherein the fifth likelihood value is associated with the second direction in the first data.

5. The computer-implemented method of claim 1, wherein determining the second target likelihood data further comprises:
   determining, using a first portion of the first data corresponding to the first sound, that the first sound is represented in a portion of the first audio data corresponding to the acoustic event;
   determining, using a second portion of the first data corresponding to the second sound, that the second sound is not detected in the portion of the first audio data;
   determining third target likelihood data using the first portion of the first data, wherein the third target likelihood data includes a fourth likelihood value indicating a likelihood that the first direction corresponds to the acoustic event; and
   determining the second target likelihood data using the first target likelihood data and the third target likelihood data.

6. The computer-implemented method of claim 1, wherein the second data indicates the first location associated with the first object and a second location associated with a second object, and determining the first target likelihood data further comprises:
   determining that the first location corresponds to a first plurality of directions relative to the device; and
   associating the first likelihood value with at least one of the first plurality of directions.

7. The computer-implemented method of claim 6, further comprising:
   determining that the second location corresponds to a second plurality of directions relative to the device; and
   determining third target likelihood data using the second data, wherein the third target likelihood data associates a fourth likelihood value with a third direction of the second plurality of directions, the fourth likelihood value indicating a likelihood that the third direction corresponds to the acoustic event.

8. The computer-implemented method of claim 1, wherein the second data indicates the first location associated with the first object and a second location associated with a second object, and determining the first target likelihood data further comprises:
   determining that the first location corresponds to a first plurality of directions relative to the device;
   associating the first likelihood value with at least one of the first plurality of directions;
   determining that the second location corresponds to a second plurality of directions relative to the device; and
   associating the first likelihood value with at least one of the second plurality of directions.

9. The computer-implemented method of claim 1, wherein determining the first target likelihood data further comprises:
   determining that the first location corresponds to a plurality of directions relative to the device;
   determining, using the second data, that the first object corresponds to an acoustically reflective surface; and
   associating the first likelihood value with a third direction of the plurality of directions, wherein the first likelihood value indicates that the third direction is unlikely to correspond to the acoustic event.

10. The computer-implemented method of claim 1, wherein determining the first target likelihood data further comprises:
    determining that the first location corresponds to the first direction;
    determining, using the second data, that the first object corresponds to a human; and
    associating the first likelihood value with the first direction, wherein the first likelihood value indicates that the first direction is likely to correspond to the acoustic event.

11. The computer-implemented method of claim 1, wherein determining the first target likelihood data further comprises:
    determining that the first location corresponds to a plurality of directions relative to the device;
    determining a first distance value associated with a third direction of the plurality of directions and a second distance value associated with a fourth direction of the plurality of directions;
    determining, using the first distance value, the first likelihood value, wherein the first likelihood value is associated with the third direction in the first target likelihood data; and
    determining, using the second distance value, a fourth likelihood value, wherein the fourth likelihood value is associated with the fourth direction in the first target likelihood data.

12. A system comprising:
    at least one processor; and
    memory including instructions operable to be executed by the at least one processor to cause the system to:
      receive first audio data corresponding to audio captured by at least one microphone of a device;
      determine first data using the first audio data, wherein the first data associates a first sound with a first direction relative to the device and associates a second sound with a second direction relative to the device;
      receive second data corresponding to at least a first location associated with a first object;
      determine that an acoustic event is represented in the first audio data;
      determine first target likelihood data using the second data, wherein the first target likelihood data associates a first likelihood value with at least one direction corresponding to the first location;
      determine second target likelihood data using the first data and the first target likelihood data, wherein the second target likelihood data associates a second likelihood value with the first direction and a third likelihood value with the second direction; and
      associate the acoustic event with the first direction based on the second target likelihood data.

13. The system of claim 12, wherein the memory further comprises instructions that, when executed by the at least one processor, further cause the system to:
 determine, using the first audio data, a first energy value associated with the first direction and a second energy value associated with the second direction;
 determine, using the first energy value, a fourth likelihood value, wherein the fourth likelihood value is associated with the first direction in the first data; and
 determine, using the second energy value, a fifth likelihood value, wherein the fifth likelihood value is associated with the second direction in the first data.

14. The system of claim 12, wherein the memory further comprises instructions that, when executed by the at least one processor, further cause the system to:
 determine, using a first portion of the first data corresponding to the first sound, that the first sound is represented in a portion of the first audio data corresponding to the acoustic event;
 determine, using a second portion of the first data corresponding to the second sound, that the second sound is not detected in the portion of the first audio data;
 determine third target likelihood data using the first portion of the first data, wherein the third target likelihood data includes a fourth likelihood value indicating a likelihood that the first direction corresponds to the acoustic event; and
 determine the second target likelihood data using the first target likelihood data and the third target likelihood data.

15. The system of claim 12, wherein the at least one processor and the memory are part of the device.

16. The system of claim 15, wherein the at least one processor and the memory are part of a computing system remote from the device.

17. The system of claim 12, wherein the second data indicates the first location associated with the first object and a second location associated with a second object, and the memory further comprises instructions that, when executed by the at least one processor, further cause the system to:
 determine that the first location corresponds to a first plurality of directions relative to the device;
 associate the first likelihood value with at least one of the first plurality of directions;
 determine that the second location corresponds to a second plurality of directions relative to the device; and
 associate the first likelihood value with at least one of the second plurality of directions.

18. The system of claim 12, wherein the memory further comprises instructions that, when executed by the at least one processor, further cause the system to:
 determine that the first location corresponds to a plurality of directions relative to the device;
 determine, using the second data, that the first object corresponds to an acoustically reflective surface; and
 associate the first likelihood value with a third direction of the plurality of directions, wherein the first likelihood value indicates that the third direction is unlikely to correspond to the acoustic event.

19. The system of claim 12, wherein the memory further comprises instructions that, when executed by the at least one processor, further cause the system to:
 determine that the first location corresponds to the first direction;
 determine, using the second data, that the first object corresponds to a human; and
 associate the first likelihood value with the first direction, wherein the first likelihood value indicates that the first direction is likely to correspond to the acoustic event.

20. The system of claim 12, wherein the memory further comprises instructions that, when executed by the at least one processor, further cause the system to:
 determine that the first location corresponds to a plurality of directions relative to the device;
 determine a first distance value associated with a third direction of the plurality of directions and a second distance value associated with a fourth direction of the plurality of directions;
 determine, using the first distance value, the first likelihood value, wherein the first likelihood value is associated with the third direction in the first target likelihood data; and
 determine, using the second distance value, a fourth likelihood value, wherein the fourth likelihood value is associated with the fourth direction in the first target likelihood data.

* * * * *